United States Patent
Numajiri et al.

(10) Patent No.: US 10,469,498 B2
(45) Date of Patent: Nov. 5, 2019

(54) COMMUNICATION SYSTEM, CONTROL INSTRUCTION APPARATUS, COMMUNICATION CONTROL METHOD AND PROGRAM

(71) Applicant: NEC Corporation, Tokyo (JP)

(72) Inventors: Remi Numajiri, Tokyo (JP); Takayuki Sasaki, Tokyo (JP); Yoichiro Morita, Tokyo (JP); Hideyuki Shimonishi, Tokyo (JP); Kentaro Sonoda, Tokyo (JP); Yoichi Hatano, Tokyo (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 14/913,457

(22) PCT Filed: Aug. 19, 2014

(86) PCT No.: PCT/JP2014/071662
§ 371 (c)(1),
(2) Date: Feb. 22, 2016

(87) PCT Pub. No.: WO2015/025848
PCT Pub. Date: Feb. 26, 2015

(65) Prior Publication Data
US 2016/0205099 A1    Jul. 14, 2016

(30) Foreign Application Priority Data
Aug. 21, 2013   (JP) ................. 2013-171266

(51) Int. Cl.
*H04L 29/06*   (2006.01)
*H04L 12/911*   (2013.01)
(Continued)

(52) U.S. Cl.
CPC .......... *H04L 63/10* (2013.01); *H04L 12/6418* (2013.01); *H04L 12/66* (2013.01);
(Continued)

(58) Field of Classification Search
CPC ..... H04L 63/10; H04L 12/6418; H04L 12/66; H04L 47/70; H04L 63/1441; H04L 63/20
See application file for complete search history.

(56) References Cited

U.S. PATENT DOCUMENTS

2005/0249214 A1*  11/2005  Peng ................. H04L 63/1458
                                                     709/224
2009/0031423 A1*  1/2009  Liu .................... H04L 63/10
                                                     726/24
(Continued)

FOREIGN PATENT DOCUMENTS

EP        2 698 952 A1     2/2014
JP        2002-312316 A   10/2002
(Continued)

OTHER PUBLICATIONS

International Search Report corresponding to PCT/JP2014/071662, dated Sep. 30, 2014 (5 pages).
(Continued)

*Primary Examiner* — Philip J Chea
*Assistant Examiner* — Robert B McAdams
(74) *Attorney, Agent, or Firm* — Wilmer Cutler Pickering Hale and Dorr LLP

(57) ABSTRACT

A control execution apparatus is provided with a communication unit that makes an inquiry concerning a packet processing method with respect to a predetermined control instruction apparatus, and a packet processing unit that processes packets based on an instruction from the control instruction apparatus. The control instruction apparatus is provided with a communication history management unit that manages communication history between nodes via the control execution apparatus, a node state determination unit that determines, making reference to the communication history of the communication history management unit, whether or not a node that is a transmission source or a transmission destination of the packet for which an inquiry concerning a processing method was received, is on a side that provides a service to another node, and a control
(Continued)

|  | SERVICE STATE | CLIENT STATE | NEITHER STATE |
|---|---|---|---|
| PACKET TRANSMISSION DESTINATION | ALLOW | PROHIBIT | ALLOW |
| PACKET TRANSMISSION SOURCE | PROHIBIT | ALLOW | ALLOW | instruction unit that prohibits, when at least the node is on the side that provides a service to another node, new communication from the node in question to the other node.

20 Claims, 34 Drawing Sheets

(51) Int. Cl.
  *H04L 12/64* (2006.01)
  *H04L 12/66* (2006.01)

(52) U.S. Cl.
  CPC .......... *H04L 47/70* (2013.01); *H04L 63/1441* (2013.01); *H04L 63/20* (2013.01)

(56) References Cited

U.S. PATENT DOCUMENTS

2013/0227687 A1* 8/2013 Lee .................... H04L 63/1425
  726/23
2014/0033275 A1   1/2014 Kawamoto
2016/0044054 A1*  2/2016 Stiansen ............. H04L 63/1416
  726/24

FOREIGN PATENT DOCUMENTS

JP    2010-117885 A    5/2010
WO   WO-2012/141086 A1  10/2012

OTHER PUBLICATIONS

Ando, et al., "Communication State-Based Access Control for Preventing Stepping-stone Attacks," Computer Security Symposium 2013, Oct. 21-23, 2013, pp. 1018-1025.
McKeown, et al., "OpenFlow: Enabling Innovation in Campus Networks," Mar. 14, 2008 (6 pages).
"OpenFlow Switch Specification," Version 1.1.0 Implemented (Wire Protocol 0x02), Feb. 28, 2011, pp. 1-56.

* cited by examiner

FIG. 2

| TRANSMISSION SOURCE NODE IDENTIFIER | TRANSMISSION SOURCE SERVICE OR PROTOCOL IDENTIFIER | TRANSMISSION DESTINATION NODE IDENTIFIER | TRANSMISSION DESTINATION SERVICE OR PROTOCOL IDENTIFIER |
|---|---|---|---|
| Host a | Service a | Host b | Service b |
| ... | ... | ... | ... |

FIG. 3

| | SERVICE STATE | CLIENT STATE | NEITHER STATE |
|---|---|---|---|
| PACKET TRANSMISSION DESTINATION | ALLOW | PROHIBIT | ALLOW |
| PACKET TRANSMISSION SOURCE | PROHIBIT | ALLOW | ALLOW |

FIG. 4

(1) WHEN NEITHER TRANSMISSION DESTINATION NOR TRANSMISSION SOURCE OF AN INQUIRY COMMUNICATION FROM THE CONTROL EXECUTION APPARATUS APPEARS IN THE COMMUNICATION HISTORY

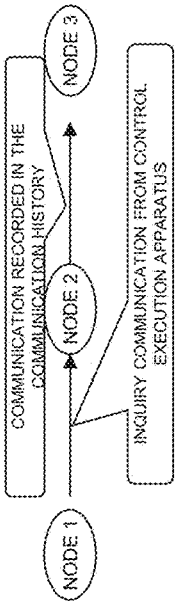

(2) WHEN A COMMUNICATION OF THE SAME COMBINATION OF TRANSMISSION SOURCE AND TRANSMISSION DESTINATION OF AN INQUIRY COMMUNICATION FROM THE CONTROL EXECUTION APPARATUS IS IN THE COMMUNICATION HISTORY

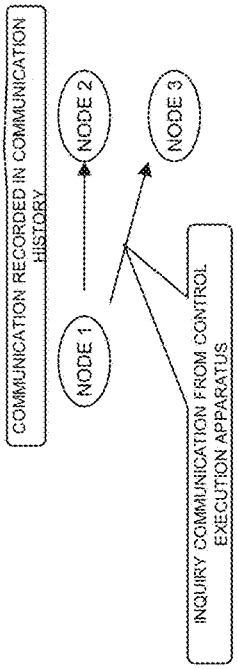

(3) WHEN THE TRANSMISSION SOURCE OF AN INQUIRY COMMUNICATION FROM THE CONTROL EXECUTION APPARATUS IS RECORDED AS A COMMUNICATION TRANSMISSION DESTINATION IN THE COMMUNICATION HISTORY

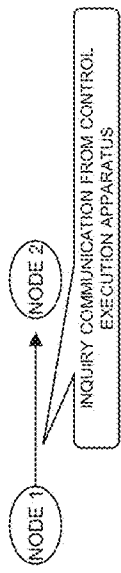

(4) WHEN THE TRANSMISSION DESTINATION OF AN INQUIRY COMMUNICATION FROM THE CONTROL EXECUTION APPARATUS IS RECORDED AS A TRANSMISSION SOURCE OF COMMUNICATION IN THE COMMUNICATION HISTORY

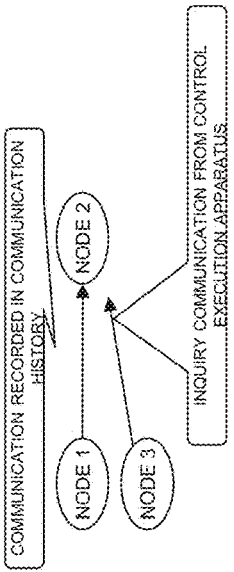

(5) WHEN THE TRANSMISSION SOURCE OF AN INQUIRY COMMUNICATION FROM THE CONTROL EXECUTION APPARATUS IS RECORDED AS A TRANSMISSION SOURCE OF ANOTHER COMMUNICATION IN THE COMMUNICATION HISTORY

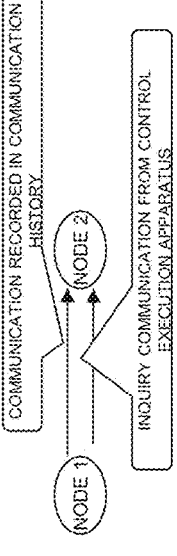

(6) WHEN THE TRANSMISSION DESTINATION OF AN INQUIRY COMMUNICATION FROM THE CONTROL EXECUTION APPARATUS IS RECORDED AS A TRANSMISSION DESTINATION OF ANOTHER COMMUNICATION IN THE COMMUNICATION HISTORY

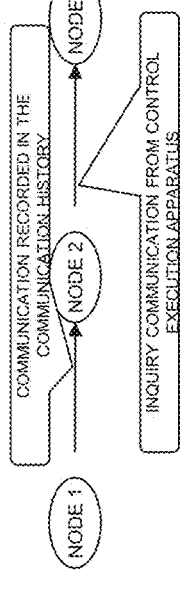

FIG. 14

| SERVICE OR PROTOCOL IDENTIFIER | TRANSMISSION SOURCE / TRANSMISSION DESTINATION | NODE STATE |
|---|---|---|
| Service a | TRANSMISSION DESTINATION | SERVER |
| Service a | TRANSMISSION SOURCE | CLIENT |

FIG. 15

| TRANSMISSION SOURCE | TRANSMISSION DESTINATION | PROCESSING CONTENT |
|---|---|---|
| Host a | Host b | ACCESS DENIED |
| * | Host c | ACCESS ALLOWED |
| Host d | * | ACCESS ALLOWED |

FIG. 16

| src | dst | ACTION |
|---|---|---|
| 192.168.0.2 | 192.168.0.3 | deny |
| * | 192.168.0.1 | allow |
| 192.168.0.2 | * | allow |

FIG. 24

| PORT NUMBER | TRANSMISSION SOURCE / TRANSMISSION DESTINATION | NODE STATE |
|---|---|---|
| 3389 | dst | SERVER |
| 3389 | src | CLIENT |
| 5001 | dst | SERVER |
| 5001 | src | CLIENT |

FIG. 25

| src | dst | ACTION |
|---|---|---|
| 192.168.0.2 | 192.168.0.3 | allow |
| * | 192.168.0.1 | allow |
| 192.168.0.3 | * | allow |

FIG. 32

| src | dst | ACTION |
|---|---|---|
| 192.168.0.1 | 192.168.0.2 | deny |
| * | 192.168.0.1 | allow |
| 192.168.0.2 | * | allow |

COMMUNICATION SYSTEM, CONTROL INSTRUCTION APPARATUS, COMMUNICATION CONTROL METHOD AND PROGRAM

TECHNICAL FIELD

Cross-Reference to Related Applications

This application is a national stage application of International Application No. PCT/JP2014/071662, filed on Aug. 19, 2014, which claims priority to Japanese Patent Application No. 2013-171266, filed on Aug. 21, 2013 the disclosures of each are hereby incorporated in their entirety. The present invention relates to a communication system, a control instruction apparatus, a communication control method and a program, and in particular relates to a communication system, a control instruction apparatus, a communication control method and a program, which control communication between nodes.

BACKGROUND

In recent years, technology known as OpenFlow has been proposed (see Non-Patent Literature (NPL) 1 and 2). In OpenFlow, communication is taken as end-to-end flow, and path control, failure recovery, load balancing and optimization are performed on a per-flow basis. An OpenFlow switch as specified in Non-Patent Literature 2 is provided with a secure channel for communication with an OpenFlow controller, and operates according to a flow table in which appropriate addition or rewriting is instructed by the OpenFlow controller. In the flow table, for each flow there are definitions of sets of match conditions (Match Fields) that match packet headers, flow statistical information (Counters), and instructions (Instructions) that define processing content (refer to "4.1 Flow Table" in Non Patent Literature 2).

For example, when an OpenFlow switch receives a packet, a search is made for an entry having a match condition (refer to "4.3 Match Fields" in Non-Patent Literature 2) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping and the like) described in an Instructions field of the entry in question, for the received packet. On the other hand, as a result of the search, in a case where an entry matching the received packet is not found, the OpenFlow switch transmits a request for entry setting to the OpenFlow controller via the secure channel, that is, a request (Packet-In message) to transmit control information for processing the received packet. The OpenFlow switch receives a flow entry with determined processing content and updates the flow table. In this way, the OpenFlow switch performs packet forwarding using entries stored in the flow table as control information.

Patent Literature (PTL) 1 discloses an example of an access control apparatus that performs Role-Based Access Control (below, "RBAC"). The access control apparatus of the same patent literature stores a user information table in which attribute values are set for respective users, a role information table in which roles indicating attribute value combinations are set, and an access control table in which role IDs are set as access conditions for respective contents. The access control apparatus of the same patent literature then sets a list of users where attribute values correspond to roles, in a user list information table for respective roles, based on the user information table and the role information table. There is a description that when a request to access content is made, an access control unit identifies an access condition role based on the access control table, and identifies access authority according to whether an accessing user is included in a user list for a particular role.

[PTL 1] Japanese Patent Kokai Publication No. JP2010-117885A

[NPL 1] Nick McKeown and seven other authors, "OpenFlow: Enabling Innovation in Campus Networks", [online], [Search performed on Aug. 7, 2013], Internet <URL: http://www.openflow.org/documents/openflow-wp-latest.pdf>

[NPL 2] "Openflow Switch Specification" Version 1.1.0. Implemented (Wire Protocol 0x02), [online], [Search performed on Aug. 7, 2013], Internet <URL: URL: http://www.openflow.org/documents/openflow-spec-v1.1.0.pdf>

SUMMARY

The following analysis is given according to the present invention. Using technology of Non-Patent Literature 1 and 2, by setting flow entries giving consideration to roles in an OpenFlow switch on a path, role-based access control as in Patent Literature 1 is clearly possible and even path control can be realized.

However, in cyber-attacks in recent years, an in-company node is accessed from outside, and using this in-company node as a springboard, other in-company nodes are also accessed and information collecting is carried out. Thus, in order to prevent this type of attack, technology is desired to detect when a certain node is operating, without being noticed, as a springboard (known as a zombie), and also to control the behavior of the zombie.

However, there is a problem in the technology of the abovementioned patent literature and non-patent literature in that it is not possible to control the behavior of a node operating as a springboard or zombie described above. The reason for this is that although proper access control is performed when a certain node is connected, no mechanism exists to thereafter detect the start of operation as a springboard or zombie.

It is an object of the present invention to provide a communication system, a control instruction apparatus, a communication control method and a program, which can prevent a node that has permission to communicate, from operating as a springboard or zombie as described above.

According to a first aspect, there is provided a communication system having: a control execution apparatus having a communication unit that makes an inquiry concerning a packet processing method, with respect to a prescribed control instruction apparatus, and a packet processing unit that processes packets based on an instruction from the control instruction apparatus; and a control instruction apparatus having a communication history management unit that manages communication history between nodes via the control execution apparatus, a node state determination unit that determines, making reference to the communication history of the communication history management unit, whether or not a node that is a transmission source or a transmission destination of the packet for which the inquiry concerning a processing method was received, is on a side that provides a service to another node, and a control instruction unit that prohibits, when at least the node is on the side that provides a service to another node, new communication from the node in question to the other node.

According to a second aspect, there is provided a control instruction apparatus having: a communication history management unit that manages communication history between nodes via a control execution apparatus having a communication unit that makes an inquiry concerning a packet processing method, with respect to a control instruction apparatus, and a packet processing unit that processes packets based on an instruction from the control instruction apparatus; a node state determination unit that determines, making reference to the communication history of the communication history management unit, whether or not a node that is a transmission source or a transmission destination of a packet for which an inquiry concerning a processing method was received, is on a side that provides a service to another node, and a control instruction unit that prohibits, when at least the node is on the side that provides a service to another node, new communication from the node in question to the other node.

According to a third aspect, there is provided a communication control method executed by a computer connected to a control execution apparatus having a communication unit that makes an inquiry concerning a packet processing method, with respect to a prescribed control instruction apparatus, and a packet processing unit that processes packets based on an instruction from the control instruction apparatus, the computer having a communication history management unit that manages communication history between nodes via the control execution apparatus, the method having determining, by making reference to the communication history of the communication history management unit, whether or not a node that is a transmission source or a transmission destination of a packet for which an inquiry concerning a processing method was received, is on a side that provides a service to another node, and prohibiting, when at least the node is on the side that provides a service to another node, new communication from the node in question to the other node. The present method is associated with a particular mechanism, which is a computer that functions as the control instruction apparatus that controls the control execution apparatus.

According to a fourth aspect, there is provided a non-transient computer-readable storage medium that records a program executed on a computer connected to a control execution apparatus having a communication unit that makes an inquiry concerning a packet processing method, with respect to a prescribed control instruction apparatus, and a packet processing unit that processes packets based on an instruction from the control instruction apparatus, the computer having a communication history management unit that manages communication history between nodes via the control execution apparatus, the program having: a process of determining, by making reference to the communication history of the communication history management unit, whether or not a node that is a transmission source or a transmission destination of a packet for which an inquiry concerning a processing method was received, is on a side that provides a service to another node, and a process of prohibiting, when at least the node is on the side that provides a service to another node, new communication from the node in question to the other node. It is to be noted that this program may be recorded on a computer-readable (non-transient) storage medium. That is, the present invention may be embodied as a computer program product. As for further aspects, reference is made to the disclosure of preferred modes summarized later on.

The meritorious effects of the present disclosure are summarized as follows. According to the present disclosure, it is possible to prevent a node, which has permission to communicate, from operating as the abovementioned springboard or zombie. That means that the present invention transforms the communication system and related apparatuses described as prior art into those that having improved function to prevent a node from operating as the springboard or zombie.

BRIEF DESCRIPTION OF DRAWINGS

FIG. 2 is a diagram showing an example of communication history information held by a control instruction apparatus of the first exemplary embodiment of the disclosure.

FIG. 3 is a diagram showing an example of a policy used for the control instruction apparatus of the first exemplary embodiment of the disclosure to determine whether or not to allow communication.

FIG. 4 is a diagram showing a communication control pattern according to the control instruction apparatus of the first exemplary embodiment of the disclosure.

FIG. 14 is a diagram showing an example of a second table (node state determination table) held by a control instruction apparatus of the second exemplary embodiment of the disclosure.

FIG. 15 is a diagram showing an example of a third table (accessibility determination table) held by a control instruction apparatus of the second exemplary embodiment of the disclosure.

FIG. 16 is a diagram showing another example of the third table (accessibility determination table) held by a control instruction apparatus of the second exemplary embodiment of the disclosure.

FIG. 24 is a diagram showing an example of a node state determination table held by a policy database (policy DB) of a control instruction apparatus of the fourth exemplary embodiment of the disclosure.

FIG. 25 is a diagram showing an example of an accessibility determination table held by an access control rule database (access control rule DB) of the control instruction apparatus of the fourth exemplary embodiment of the disclosure.

FIG. 32 is a diagram showing another example of an accessibility determination table held by an access control rule database (access control rule DB) of the control instruction apparatus of the fourth exemplary embodiment of the disclosure.

PREFERRED MODES

Figure 1:
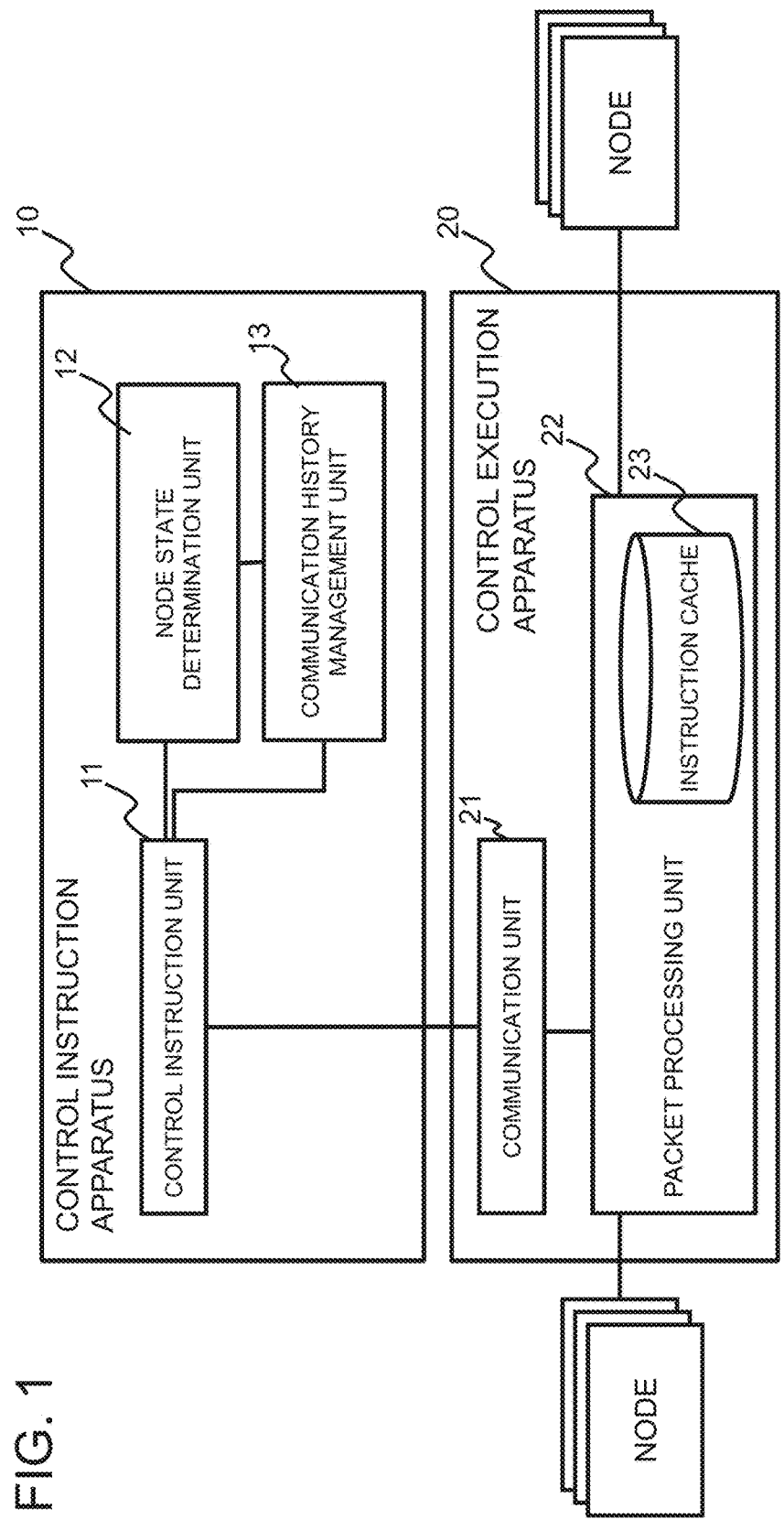
FIG. 1 is a diagram showing a configuration of a communication system in a first exemplary embodiment of the present disclosure.

First, a description is given of an outline of exemplary embodiments of the present disclosure, making reference to the drawings. It is to be noted that reference symbols in the drawings attached to this outline are added to respective elements for convenience, as examples in order to aid understanding, and are not intended to limit the present disclosure to modes illustrated in the drawings.

The present disclosure may be implemented, in an exemplary embodiment thereof, as shown in FIG. 1, by a configuration connecting a control execution apparatus (20 in FIG. 1) provided with a communication unit that makes an inquiry to a predetermined control instruction apparatus concerning a method for processing a packet, and a packet processing unit that processes the packet based on an instruction from the control instruction apparatus; and a control instruction apparatus (10 in FIG. 1) that gives an instruction to the control execution apparatus.

More specifically, the control instruction apparatus (10 in FIG. 1) is provided with a communication history management unit (13 in FIG. 1) that manages communication history between nodes via the control execution apparatus (20 in FIG. 1); a node state determination unit (12 in FIG. 1) that determines, making reference to the communication history of the communication history management unit (13 in FIG. 1), whether or not a node that is a transmission source or a transmission destination of a packet for which an inquiry concerning a processing method was received, is on a side that provides a service to another node; and a control instruction unit (11 in FIG. 1) that prohibits, when at least the node is on the side that provides the service to the other node, new communication from the node to the other node.

As described above, by making the control instruction apparatus (10 in FIG. 1) operate, a node on a service-providing side, namely, a computer operating as a server or the like, is made a springboard, and it is possible to detect when an attempt to start communication is made and to prohibit this communication.

First Exemplary Embodiment

Next, a detailed description is given concerning a first exemplary embodiment of the present disclosure, making reference to the drawings. FIG. 1 is a diagram showing a configuration of a communication system in a first exemplary embodiment of the present disclosure. Referring to FIG. 1, a configuration is shown connecting a control execution apparatus 20, and a control instruction apparatus 10 that realizes communication between nodes by giving an instruction to the control execution apparatus 20.

The control instruction apparatus 10 is provided with a communication history management unit 13 that manages communication history between nodes by recording information stored in headers and the like of received packets; a node state determination unit 12 that determines, making reference to the communication history recorded in the communication history management unit 13, the state of a node of a transmission source or transmission destination of a packet for which an inquiry has been received regarding processing method from the control execution apparatus 20; and a control instruction unit 11 that transmits an instruction message or the like concerning processing of a received packet determined based on the node state to the control execution apparatus 20.

The control execution apparatus 20 is provided with a communication unit 21 that transmits to, and receives from, the control instruction apparatus 10, control messages including control information; and a packet processing unit 22 that processes received packets using the control information received from the communication unit 21.

The communication history management unit 13 of the control instruction apparatus 10 holds entries for recording information stored in headers and the like of received packets.

FIG. 2 is a diagram showing an example of an entry held in the communication history management unit 13. In the example of FIG. 2, an identifier of a packet transmission source and transmission destination, and an identifier of a service or protocol are recorded. It is to be noted that in the example of FIG. 2, an example is shown in which 1 transmission source identifier is recorded, but it is possible to record a plurality of identifiers such as identifiers of respective layers of a network or the like. For example, a MAC (Media Access Control) address which is a layer 2 (L2) identifier of an OSI (Open Systems Interconnection)

reference model or an IP (Internet Protocol) address which is a layer 3 (L3) identifier may be recorded. In the same way, a plurality of transmission destination identifiers may be recorded. It is also possible to record not 1 but a plurality of transmission source and transmission destination service or protocol identifiers.

The node state determination unit 12 of the control instruction apparatus 10 refers to information recorded in the communication history management unit 13 to determine the state of a node that is to perform communication thereafter. A detailed description showing a specific example concerning determination method for a node state is given later.

The control instruction unit 11 of the control instruction apparatus 10 performs access control (an instruction to the control execution apparatus) based on a determination result of the node state determination unit 12. The control instruction unit 11 records the identifier or the like that is extracted from a packet to be processed, in the communication history management unit 13.

Here, a description is given concerning operations in determining the state of a node in the node state determination unit 12. In a case where there is recorded in the communication history management unit 13 an identifier of a transmission source or transmission destination node of a packet for which an inquiry was received concerning processing method from the control execution apparatus 20, the node state determination unit 12 confirms, based on this information, whether the node is in a "client state" or a "server state". Here, a "server state" is a state in which the node accepts a communication connection, that is, a state in which a service is provided in response to a request from a client or the like. On the other hand, a client state is a state in which a connection is made from the node to another node, that is, provision of a service is accepted with respect to a server or the like.

Specifically, by referring to information recorded in the communication history management unit 13, in a case of a communication history in which communication is started with the node in question as a packet destination, the node state determination unit 12 regards the node as having accepted a connection from another node, and determines that the node in question is in a "server state". In a case of a communication history in which communication is started with the node in question as a packet transmission source, a connection is regarded as being made from the node in question to another node, and a determination of a "client state" is made. It is to be noted that in a case where there is no information related to the node in question in the communication history, the node state determination unit 12 determines neither a server state nor a client state.

The node state determination unit 12 performs a similar determination concerning a transmission source node of a packet for which an inquiry was received concerning processing method from the control execution apparatus 20.

The control instruction unit 11 performs access control based on a determination result by the node state determination unit 12.

FIG. 3 is a diagram showing an example of a policy used for the control instruction unit 11 to determine whether or not to allow communication. In the first entry of FIG. 3, when a packet destination node is not in a client state, that is, when in a server state or not in either state, a determination is made to allow communication.

Conversely, in a case where a transmission destination node of a packet, for which an inquiry was received concerning processing method from the control execution apparatus 20, is in a client state, the control instruction unit 11 prohibits the node in question from being in a server state. Specifically, the control instruction unit 11 gives an instruction to drop the packet, to the control execution apparatus 20 so that the node in question does not receive a connection from another node.

In the second entry of FIG. 3, when a packet source node is not in a server state, that is, when in a client state or in neither state, a determination is made to allow communication. Specifically, when a transmission source node of a packet, for which an inquiry was received concerning processing method from the control execution apparatus 20, is not in a server state, the control instruction unit 11 instructs the control execution apparatus 20 to forward the packet.

Conversely, in a case where a transmission source node of a packet, for which an inquiry was received concerning processing method from the control execution apparatus 20, is in a server state, the control instruction unit 11 prohibits the node in question from being in a client state. Specifically, the control instruction unit 11 gives an instruction to drop the packet, to the control execution apparatus 20 so that the node in question does not make a connection to another node.

Putting the above together, when the determination is "allow" for both packet transmission source and transmission destination nodes, the control instruction unit 11 instructs the control execution apparatus 20 to forward (allow access for) a packet for which an inquiry was received concerning processing method from the control execution apparatus 20. On the other hand, in a case of a determination of "prohibit" for either thereof, the control instruction unit 11 instructs dropping a packet (deny access).

The control instruction unit 11 makes a recording in the communication history management unit 13 using a result of the abovementioned determination. That is, when the determination of whether or not to allow access is "allow", and there is no entry in the table where transmission source and transmission destination are the same, the control instruction unit 11 adds an entry associating transmission source and transmission destination identifiers to the communication history management unit 13. At this time, service or protocol identifiers may also be included within an entry (see FIG. 2).

FIG. 4 summarizes operations of the control instruction apparatus according to communication history between nodes. These are broadly divided and classified into 6 patterns, and a description thereof is given below.

(1) When the communication history has neither transmission destination nor transmission source of a communication of an inquiry from the control execution apparatus:

First, a description is given concerning determination of the state of a node. In this case, since there is no record of node 1, which is a transmission source, in the communication history, a determination of "neither a server nor a client state" is made, and since there is also no record of node 2, which is a transmission destination, in the communication history, a determination of "neither a server nor a client state" is made.

As a result thereof, since the transmission source is in "neither a server nor a client state", the accessibility determination using the table of FIG. 3 is "allow". Also, since the transmission destination is in "neither a server nor a client state", the accessibility determination is "allow". Since the transmission source and the transmission destination are in "allow" states, access is allowed.

Since a record of this communication is not present in the communication storage, the control instruction unit 11 adds a new entry.

(2) When the communication history has a communication of the same combination of transmission source (node 1) and transmission destination (node 2) for communication of an inquiry from the control execution apparatus:

In this case, the transmission source (node 1) of a communication of an inquiry from the control execution apparatus is recorded as the transmission source in the communication history, and a determination of a "client state" is made. The transmission destination (node 2) of a communication of an inquiry from the control execution apparatus 20 is recorded as the transmission destination in the communication history, and a determination of a "server state" is made.

As a result thereof, since the packet transmission source (node 1) is in a "client state", the accessibility determination using the table of FIG. 3 is "allow". In the same way, since the packet transmission destination (node 2) is in a "server state", the accessibility determination node is "allow". Since the transmission source (node 1) and the transmission destination (node 2) are both "allow", the access in question is allowed.

Since the same communication record is present in the communication storage, the control instruction unit 11 does not add a new entry to the communication storage management unit 13.

(3) When the communication history has recorded a transmission source (node 2) of a communication of an inquiry from the control execution apparatus as a transmission destination:

In this case, since the transmission source (node 2) of a communication of an inquiry from the control execution apparatus is recorded as the transmission destination in the communication history, a determination of a "server state" is made.

As a result thereof, since the transmission source (node 2) of communication is in a "server state", the accessibility determination using the table of FIG. 3 is "prohibit". Therefore, irrespective of the state of the transmission destination (node 3), the communication in question is prohibited.

In this case also, a new entry is not added to the communication storage management unit 13. This is because, since communication is prohibited and a packet is dropped, actual communication does not occur.

(4) When the communication history has recorded a transmission destination (node 2) of a communication of an inquiry from the control execution apparatus as a transmission source of communication:

In this case, since the transmission destination (node 2) of communication of an inquiry from the control execution apparatus is recorded as the transmission source in the communication history, a determination of a "client state" is made.

As a result thereof, since the transmission destination is in a "client state", the accessibility determination using the table of FIG. 3 is "deny". Therefore, irrespective of the state of the transmission source (node 1), the communication in question is prohibited.

In this case also, a new entry is not added to the communication storage management unit 13. This is because, since communication is prohibited and a packet is dropped, actual communication does not occur.

(5) When the communication history has recorded a transmission source (node 1) of a communication of an inquiry from the control execution apparatus as a transmission source of another communication:

In this case, similar to case (2), since the transmission source (node 1) of communication of an inquiry from the control execution apparatus is described as a transmission source in the table, a determination of "client state" is made. A determination of accessibility using the table of FIG. 3 is "allow".

In a case where a transmission destination (node 3) of communication of an inquiry from the control execution apparatus is not in a client state as in the example shown in (4), that is, a case of being in neither a server nor client state as in the case of (1), or a case where the transmission destination (node 3) is in a server state as in the example of (1), a determination of "allow" is made for the transmission destination (node 3). As a result thereof, since both the transmission source and transmission destination are "allow", the communication in question is allowed.

Since this record of communication is not present in the communication storage, the control instruction unit 11 adds a new entry.

It is to be noted that in a case where the transmission destination (node 3) is in a client state, as in the case of (4), communication is prohibited and an entry is not added to the table.

(6) When the communication history has recorded a transmission destination of a communication of an inquiry from the control execution apparatus as a transmission destination of another communication: In this case, similar to case (2), since the transmission destination (node 2) of a communication of an inquiry from the control execution apparatus is recorded in the table as a transmission destination, a determination of "server state" is made. A determination of accessibility using the table of FIG. 3 is "allow".

On the other hand, in a case where the transmission source (node 3) is "neither server state nor client state" as in the case of (1), or when in a client state as in (2), permission is also granted for the transmission source (node 3), and since a determination that both the transmission source and transmission destination are "allowed", the communication is allowed.

It is to be noted that since this record of communication is not present in the communication storage, the control instruction unit 11 adds a new entry. It is to be noted that in a case where the transmission destination (node 2) is in a client state, as in case (4), communication is prohibited and an entry is not added to the communication history.

Continuing, a detailed description is given concerning the control execution apparatus 20 of the present exemplary embodiment, making reference again to FIG. 1. The control execution apparatus 20 is provided with a communication unit 21 and a packet processing unit 22.

On receiving an instruction to transmit a message requesting that an inquiry be made concerning processing content with regard to a received packet, from the packet processing unit 22, the communication unit 21 transmits the message to the control instruction apparatus 10. On receiving a response message with regard to the message from the control instruction apparatus 10, the communication unit 21 transmits an instruction received from the control instruction apparatus 10 to the packet processing unit 22.

When a new packet is received, the packet processing unit 22 of the control execution apparatus 20 searches for an entry matching the received packet from an instruction cache 23 provided in the packet processing unit 22. As a result of the search, in a case where an entry matching the received packet is found, the packet processing unit 22 processes the packet in accordance with the relevant entry. On the other hand, in a case where an entry matching the received packet is not found, the packet processing unit 22 requests transmission of an inquiry message concerning processing content with regard to the received packet, to the control instruction apparatus 10. In a case of receiving an entry stored in the instruction cache 23 as a response to the message, the packet processing unit 22, with regard to the instruction cache 23, stores the entry in question in the instruction cache 23. In this way, packets having the same characteristic are processed using an entry stored in the instruction cache 23. In a case of receiving a processing command or the like instructing output of a packet from the control instruction apparatus 10, as a response to the message, the packet processing unit 22 applies the instructed processing content to the packet received from the control instruction apparatus 10.

It is to be noted that the respective parts (processing means) of the control instruction apparatus 10 and the control execution apparatus 20 shown in FIG. 1 may be implemented by a computer program executing the above-mentioned respective processing on a computer configuring these apparatuses, using hardware thereof.

Figure 5:
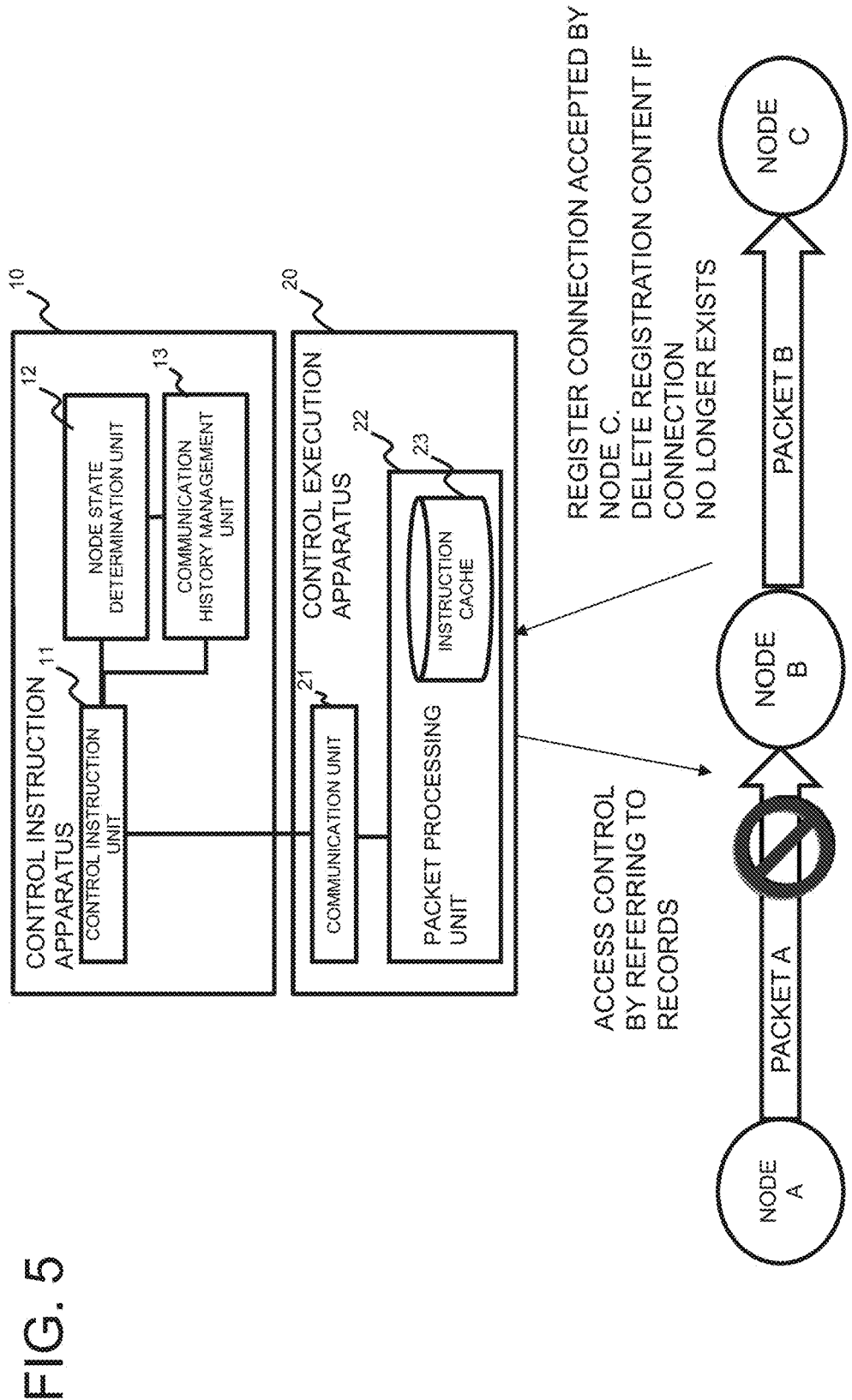
FIG. 5 is a diagram for describing a specific example of communication control by the control instruction apparatus of the first exemplary embodiment of the disclosure.
Figure 6:
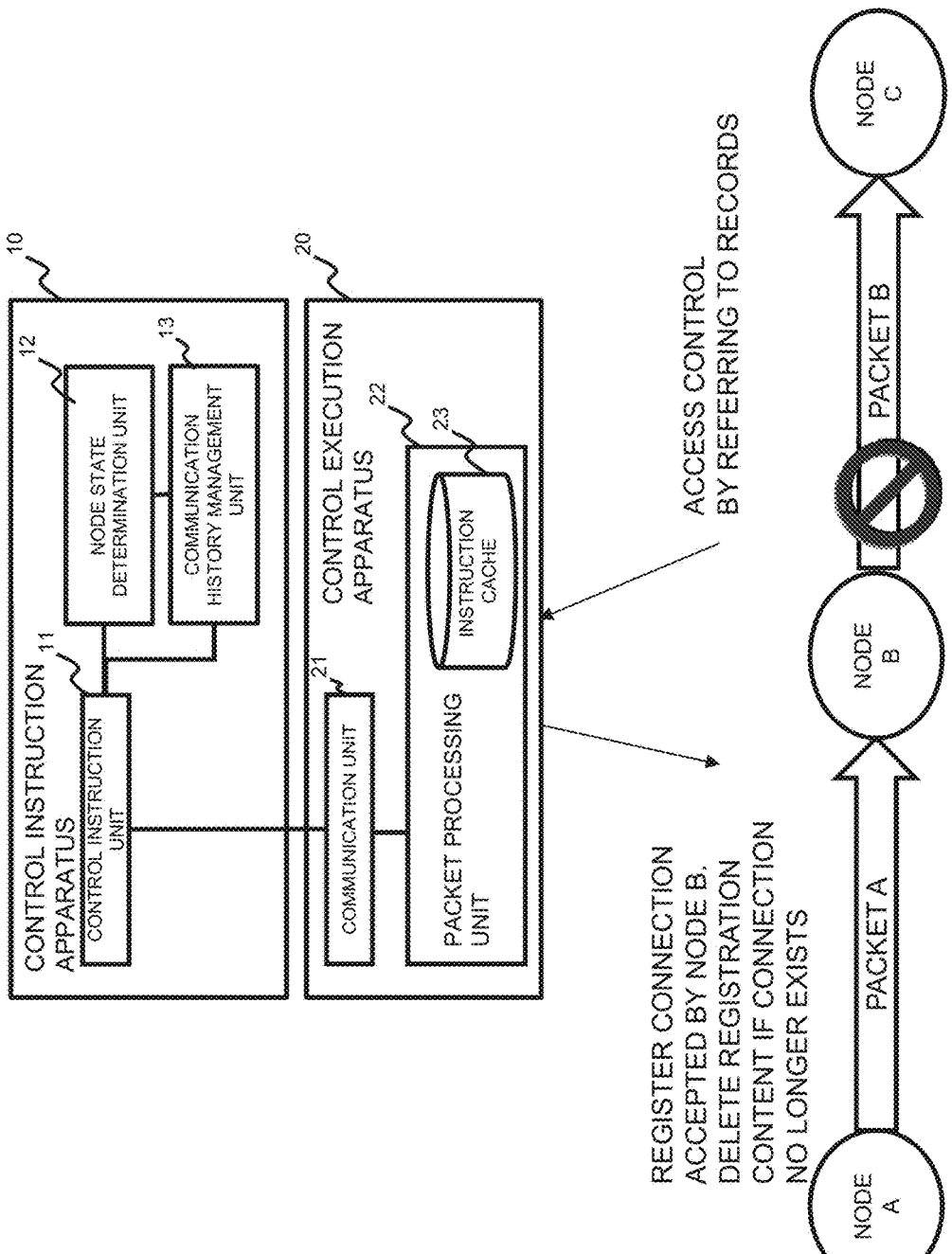
FIG. 6 is a diagram for describing a specific example of communication control by the control instruction apparatus of the first exemplary embodiment of the disclosure.

Continuing, a detailed description is given concerning operations of the present exemplary embodiment, making reference to the drawings. FIG. 5 and FIG. 6 are diagrams for describing specific examples of communication control by the control instruction apparatus of the first exemplary embodiment of the present disclosure. FIG. 5 shows a case of attempting access from node A to node B after communication between node B and node C has been established (transmission of packet B). In these diagrams, node B is in a client state when communicating with node C. In this state, on accepting access from node A, a server state occurs, and a state operating as a so-called springboard occurs. Making reference to FIG. 7 to FIG. 10, a description is given of flow up to where communication in a server state is prohibited for a node operating in a client state, by the control instruction apparatus 10 of the present exemplary embodiment.

Figure 7:
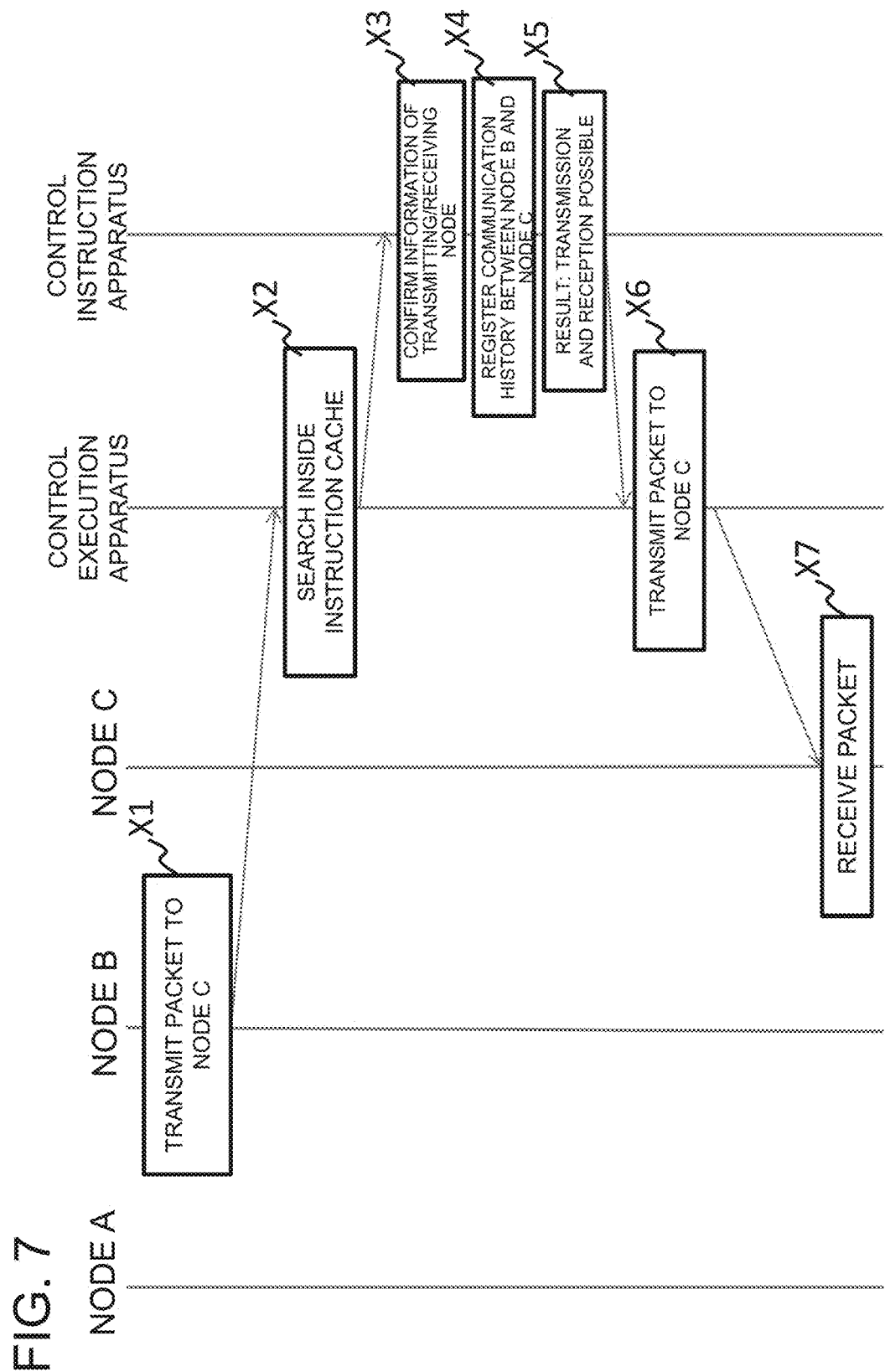
FIG. 7 is a sequence diagram representing overall operations of a communication system of the first exemplary embodiment of the disclosure.
Figure 8:
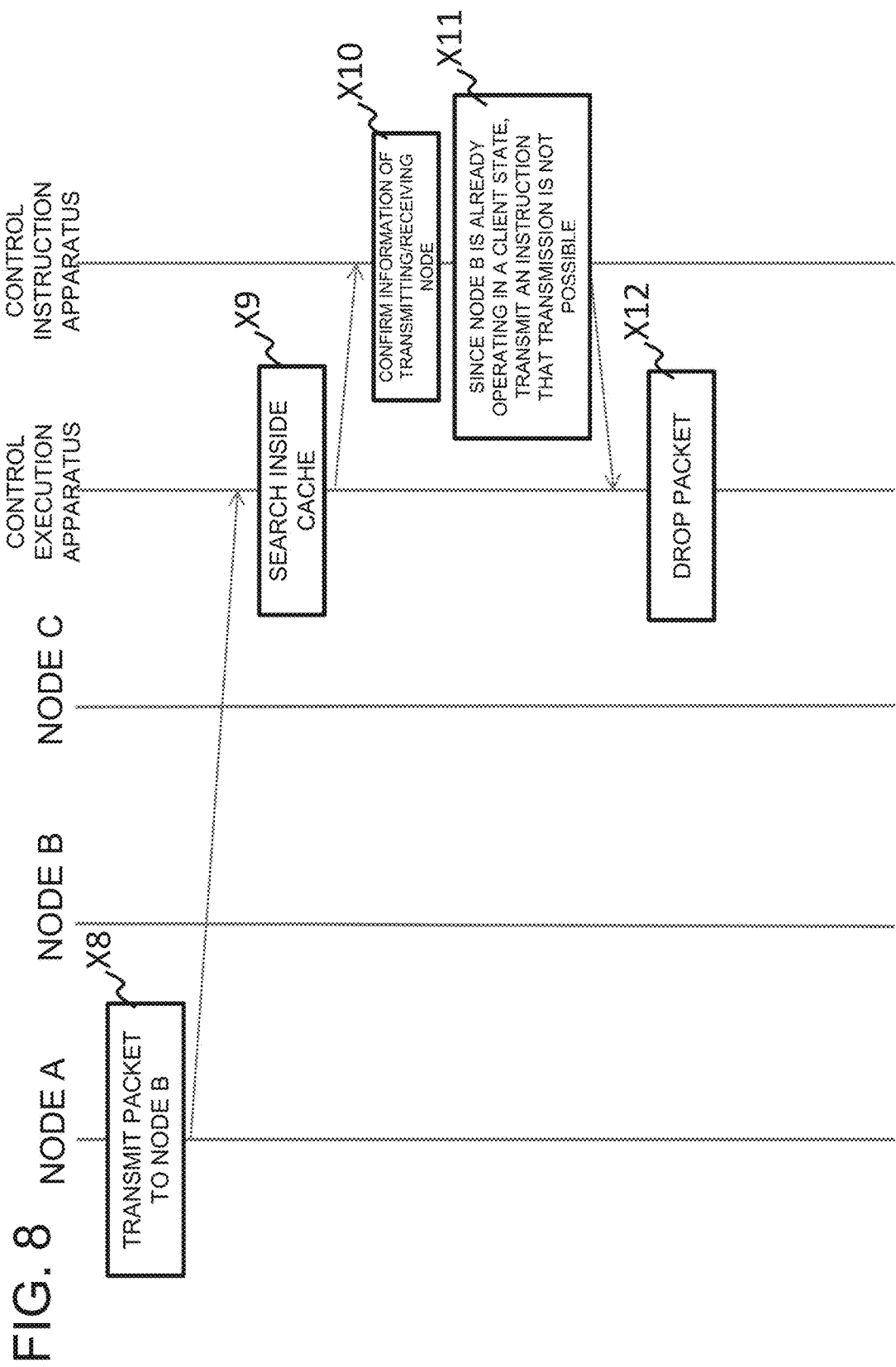
FIG. 8 is a continuity diagram of FIG. 7.

FIG. 7 and FIG. 8 are sequence diagrams representing overall operations of a communication system of the first exemplary embodiment of the present disclosure. Referring to FIG. 7, first, node B which starts communication sends a packet with destination node C to the control execution apparatus 20 (step X1). Or, a packet transmitted by node B to node C may be hooked by the control execution apparatus 20.

On receiving a packet from node B, in order to confirm whether it is preferable to make a connection from node B to node C, the control execution apparatus 20 searchers for an entry matching the packet in question from the instruction cache 23 of the control execution apparatus 20 (step X2).

Figure 9:
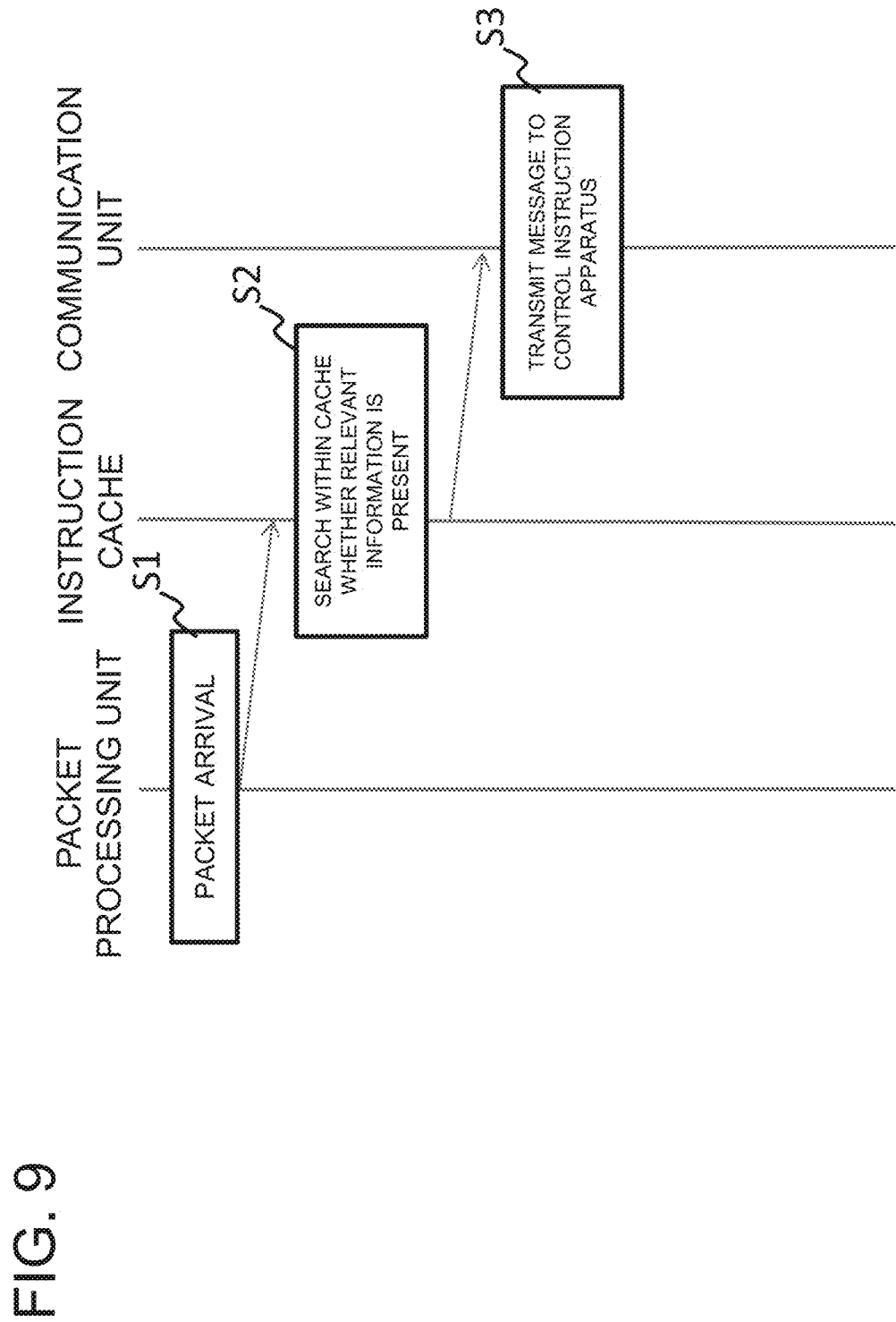
FIG. 9 is a sequence diagram representing detailed operations when a packet is received by the control execution apparatus of the first exemplary embodiment of the disclosure.

Here, a detailed description is given of operation in step X2, making reference to FIG. 9. On receiving a packet from node B to node C (step S1), the packet processing unit 22 of the control execution apparatus 20 makes a search as to whether there is a relevant entry in the instruction cache 23 based on header information of the received packet (step S2). In a case where there is already a connection between node B and node C, since a relevant entry is present in the instruction cache 23, processing content of the entry is applied to the packet. Here, since an entry matching the relevant packet is not found in the instruction cache 23, due to the communication being new, the packet processing unit 22 requests transmission of an inquiry message concerning processing content for the relevant packet, to the control instruction apparatus 10 (step S3).

Returning to FIG. 7 again, the control instruction apparatus 10 that receives an inquiry message from the communication unit 21 of the control execution apparatus 20 confirms the state of transmitting/receiving nodes, based on packet information included in the received message (step X3).

Figure 10:
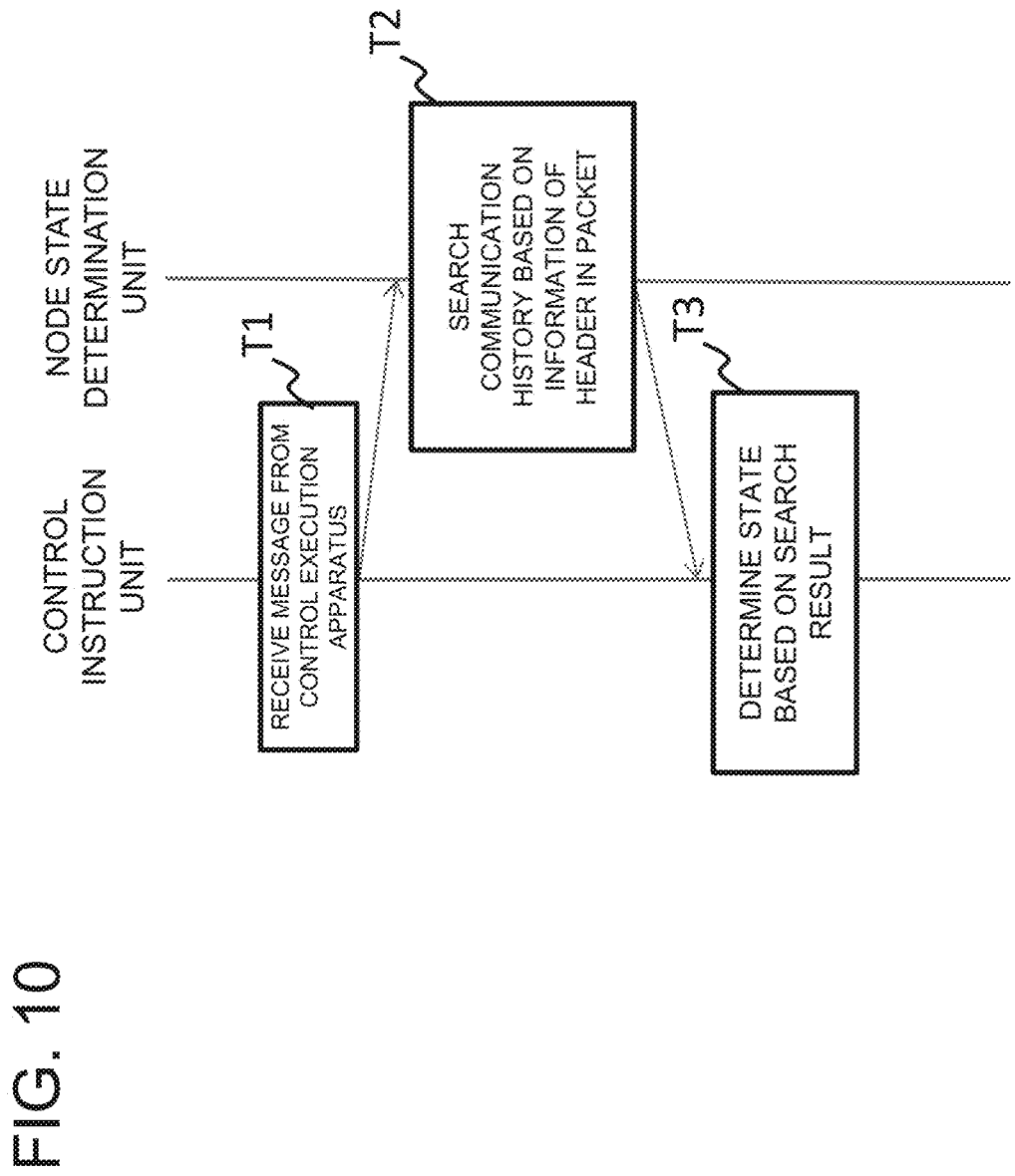
FIG. 10 is a sequence diagram representing detailed operations when a message is received by the control instruction apparatus of the first exemplary embodiment of the disclosure.

Here, a detailed description is given of operations in step X3, making reference to FIG. 10. On receiving an inquiry message from the control execution apparatus 20 (step T1), a node state determination unit 12 in the control instruction apparatus 10 searches for communication history in the communication history management unit 13 with identifiers of node B and node C, specified as transmission source and transmission destination, as keys, from packet header information in the received message (step T2). In this example, since communication history between node B and node C is not recorded, the node state determination unit 12 responds with "no history". The control instruction unit 11 that receives this response, with packet B being a first packet, determines that node B and node C are in neither a server state nor a client state, and allows communication (step T3).

Returning to FIG. 7 again, the control instruction unit 11 of the control instruction apparatus 10 registers communication history between node B and node C for which a determination is made to allow communication, in the communication history management unit 13 (step X4). Next, the control instruction unit 11 of the control instruction apparatus 10 instructs the control execution apparatus 20 to transmit/receive a packet from node B with destination of node C. Specifically, the control instruction apparatus 10 transmits a message instructing the control execution apparatus 20 to forward the packet received in step X1 to node C, and a message to store in the instruction cache 23 an entry including processing content instructing that subsequent packets from node B be forwarded to node C (step X5).

The control execution apparatus 20 that receives the message transmits received packet(s) to node C and also stores, in the instruction cache 23, instruction content from the control instruction apparatus 10 (step X6).

Node C receives a packet transmitted from the control execution apparatus 20 (step X7). According to the above, packet transmission from node B to node C is enabled.

Next, referring to FIG. 8, a description is given of operations in a case of thereafter transmitting a packet from node A to node B. When node A transmits a packet to node B (step X8), the control execution apparatus 20 searches the instruction cache 23 in the control execution apparatus 20. In the processing of step X1 to step X7 heretofore, since instructions concerning packets from node A to node B are not stored in the instruction cache 23, the control execution apparatus 20 transmits a message inquiring about processing content for received packets, to the control instruction apparatus 10 (step X9).

The node state determination unit 12 of the control instruction apparatus 10 that has received an inquiry message from the communication unit 21 of the control execution apparatus 20 confirms the state of transmitting/receiving nodes, based on packet information included in the received message (step X10). Since communication history between node B and node C is registered in the communication history management unit 13, the node state determination unit 12 obtains information related to node B from the communication history management unit 13. As a result thereof, the control instruction unit 11 confirms that node B is transmitting packets and determines that node B is in a "client state". On the other hand, since communication history related to node A is not registered in the communication history management unit 13, the control instruction unit 11 determines that node A is in neither server nor client state (step X10).

Thereafter, since node B is already operating in a client state, the control instruction unit 11 prohibits access from node A to node B (step X11). Specifically, the control instruction unit 11 instructs the control execution apparatus 20 to add to the instruction cache 23 an entry instructing that packets from node A to node B be dropped. On this occasion, communication history between node A and node B is not registered in the communication history management unit 13.

Based on an instruction from the control instruction unit 11 of the control instruction apparatus 10, the control execution apparatus 20 drops packets from node A to node B thereafter (step X12).

According to the above operations, it is possible to prohibit communication from node A to node B, that is, communication such that node B, which is in a client state, goes to a server state.

Next, a description is given of an example of prohibiting a node operating in a server state from also operating in a client state. FIG. 6 indicates a case (transmit packet B) where node B attempts to access node C after communication between node A and node B has been established (packet A transmitted). In the diagram, node B is in a server state when communicating with node A. In this state, on commencing access to node C, a client state occurs, and a state operating as a so-called springboard occurs. Making reference to FIG. 11 to FIG. 12, a description is given of flow up to where new communication by a node operating in a server state is prohibited by the control instruction apparatus 10 of the present exemplary embodiment.

Figure 11:
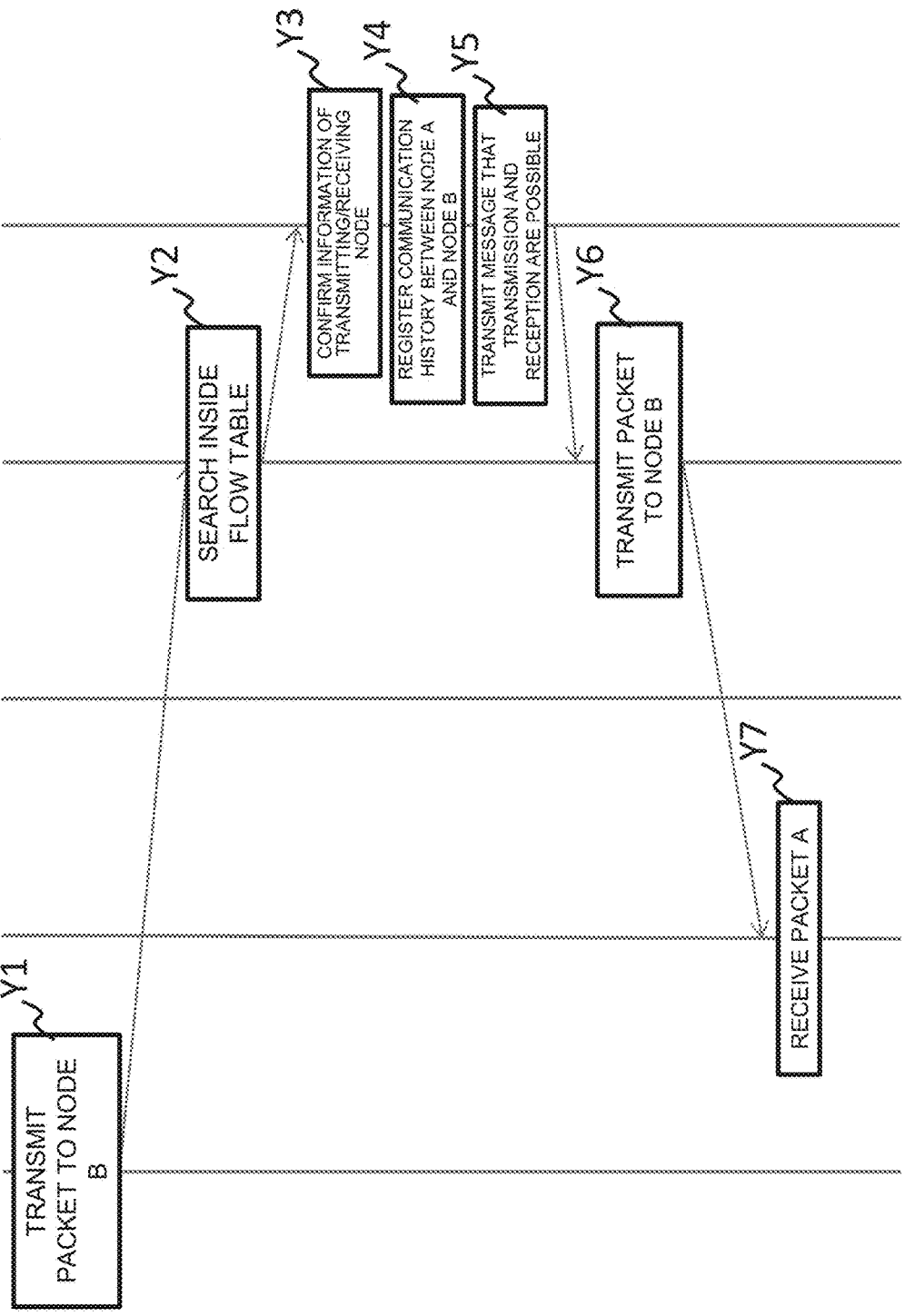
FIG. 11 is another sequence diagram representing overall operations of a communication system of the first exemplary embodiment of the disclosure.
Figure 12:
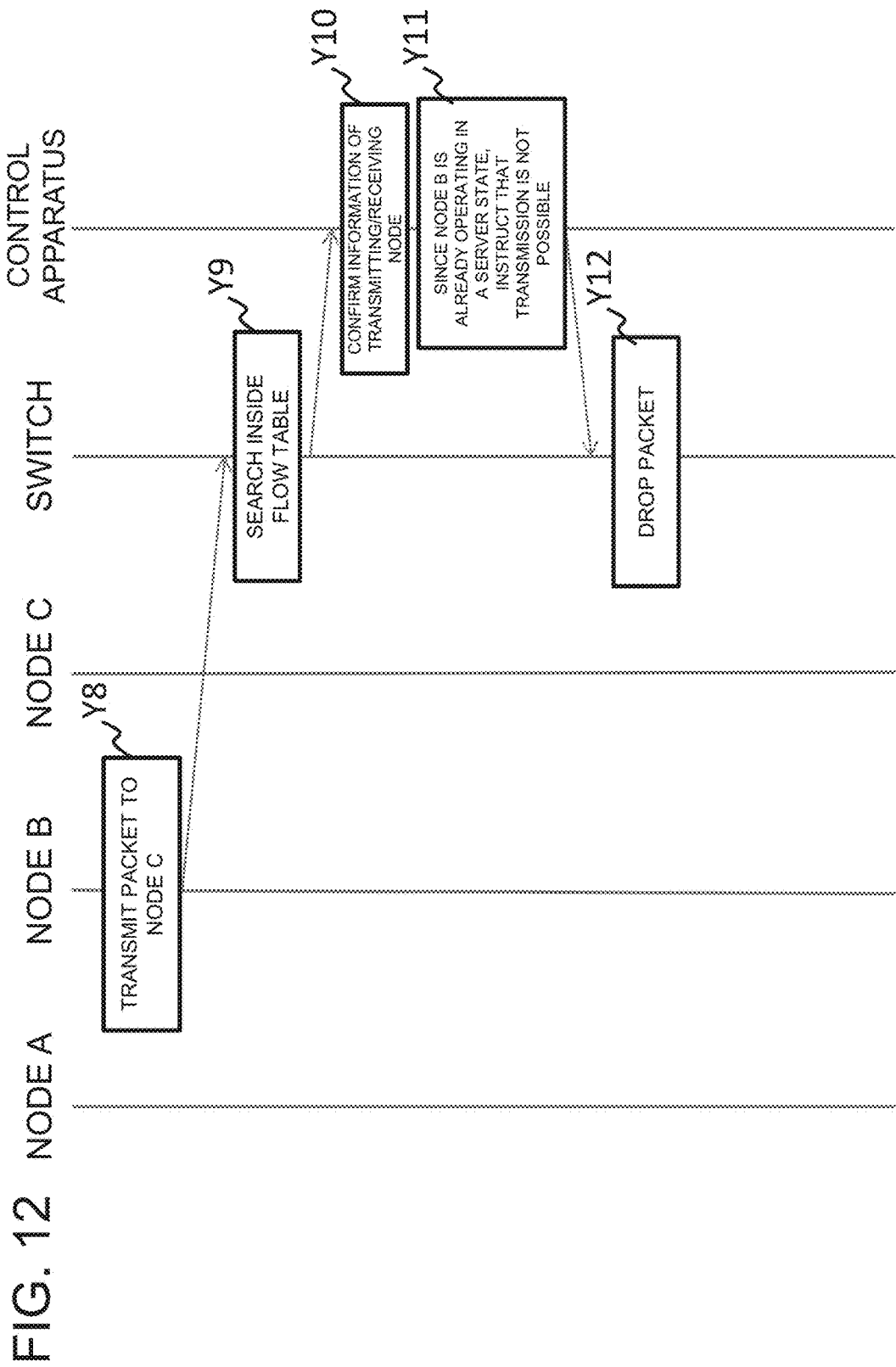
FIG. 12 is a continuity diagram of FIG. 11.

FIG. 11 and FIG. 12 are different sequence diagrams representing overall operations of a communication system of the first exemplary embodiment of the present disclosure. Referring to FIG. 11, first, node A which starts communication sends a packet with destination node B to the control execution apparatus 20 (step Y1).

On receiving the packet from node A, in order to confirm whether it is preferable to make a connection from node A to node B, the control execution apparatus 20 searches for an entry matching the packet in question from the instruction cache 23 of the control execution apparatus 20 (step Y2). Operation in step Y2 is similar to that shown in FIG. 9, and a message is transmitted inquiring about processing content to be applied to a received packet, to the control instruction apparatus 10 from the control execution apparatus 20. Since other details are similar to FIG. 9, a description is omitted.

The control instruction apparatus 10 that has received an inquiry message from the communication unit 21 of the control execution apparatus 20 confirms the state of transmitting/receiving nodes, based on packet information included in the received message (step Y3). Here, since communication history between node A and node B is not recorded in the communication history management unit 13, the control instruction apparatus 10 determines that neither node A nor node B is in a server state nor a client state, and communication is allowed. Since other details are similar to FIG. 10, a description is omitted.

Thereafter, the control instruction unit 11 of the control instruction apparatus 10 registers communication history between node A and node B for which a determination has been made to allow the communication, in the communication history management unit 13 (step Y4). Next, the control instruction unit 11 of the control instruction apparatus 10 instructs the control execution apparatus 20 to transmit/receive packets between node A and node B. Specifically, the control instruction apparatus 10 transmits a message instructing the control execution apparatus 20 to forward packets received in step Y1 to node B, and a message to store, in the instruction cache 23, an entry including processing content instructing that subsequent packets received from node A be forwarded to node B (step Y5).

The control execution apparatus 20 that receives the message transmits received packets to node B and also stores, in the instruction cache 23, instruction content from the control instruction apparatus 10 (step Y6).

Node B receives packets transmitted from the control execution apparatus 20 (step Y7). According to the above, packet transmission from node A to node B is enabled.

Next, referring to FIG. 12, a description is given of operations in a case of thereafter transmitting packets from node B to node C. When node B transmits a packet to node C (step Y8), the control execution apparatus 20 searches the instruction cache 23 in the control execution apparatus 20. In the processing of step Y1 to step Y7 heretofore, since instructions concerning packets from node B to node C are not stored in the instruction cache 23, the control execution apparatus 20 transmits a message to the control instruction apparatus 10 inquiring about processing content for received packets. (step Y9).

The node state determination unit 12 of the control instruction apparatus 10 that receives an inquiry message from the communication unit of the control execution apparatus 20 confirms the state of transmitting/receiving nodes, based on packet information included in the received message (step Y10). Since communication history between node A and node B is registered in the communication history management unit 13, the node state determination unit 12 obtains information related to node B from the communication history management unit 13. As a result thereof, the control instruction unit 11 confirms that node B is receiving packets and determines that node B is in a "server state". On the other hand, since communication history related to node C is not registered in the communication history management unit 13, the control instruction unit 11 determines that node A is in neither a server nor client state (step Y10).

Thereafter, since node B is already operating in a server state, the control instruction unit 11 prohibits access from node B to node C (step Y11). Specifically, the control instruction unit 11 instructs the control execution apparatus 20 to add to the instruction cache 23 an entry instructing that packets from node B to node C be dropped. On this occasion, communication history between node B and node C is not registered in the communication history management unit 13.

Based on an instruction from the control instruction unit 11 of the control instruction apparatus 10, the control execution apparatus 20 drops subsequent packets from node B to node C (step Y12).

According to the above operations, it is possible to prohibit communication from node B to node C, that is, communication such that node B which is in a server state goes to a client state.

It is to be noted that in the abovementioned exemplary embodiment a description has been given in which an entry associating identifiers of transmission source and transmission destination is registered in the communication history management unit 13, but it is possible to use a transmission destination IP address and port number for a received packet, instead of these identifiers.

In the abovementioned exemplary embodiment, no mention was made concerning timing of sweeping out an entry in the communication history of the control instruction apparatus 10 or the instruction cache 23 of the control execution apparatus 20, but it is desirable, for example, to perform control to remove, in a timeout manner, entries that have not been used in a fixed time period (aging process). It is to be noted that in the control execution apparatus 20, when this timeout occurs, it is desirable that the control execution apparatus 20 transmits a message indicating that an entry has been removed by timeout, to the control instruction apparatus 10. Based on this notification, the control instruction apparatus 10 can remove a corresponding entry of the communication history management unit 13 on the control instruction apparatus 10 side.

Or, a mechanism may be added to detect the end of communication between nodes, on the control execution apparatus 20 side, to make a more accurate determination concerning whether or not an entry in the instruction cache 23 is necessary. As a mechanism to detect the end of communication between the nodes, a method may be cited in which a connection type communication protocol end message is checked. For example, in TCP (Transmission Control Protocol), it is possible to detect an end of communication by checking a FIN flag or an ACK flag from the opposite direction. In this case also, it is desirable that the control execution apparatus 20 transmits a message indicating that an entry in the instruction cache 23 has been removed by flow end detection, to the control instruction apparatus 10. Based on this notification, the control instruction apparatus 10 can remove a corresponding entry in the communication history management unit 12 on the control instruction apparatus 10 side.

The abovementioned control execution apparatus 20 may be implemented as a firewall or a network switch. In the abovementioned description the control execution apparatus 20 is a physical apparatus, but it is also possible, for example, to have a personal firewall or virtual switch implemented by software operating in node A, node B and node C, that is, in a communication terminal.

Second Exemplary Embodiment

Figure 13:
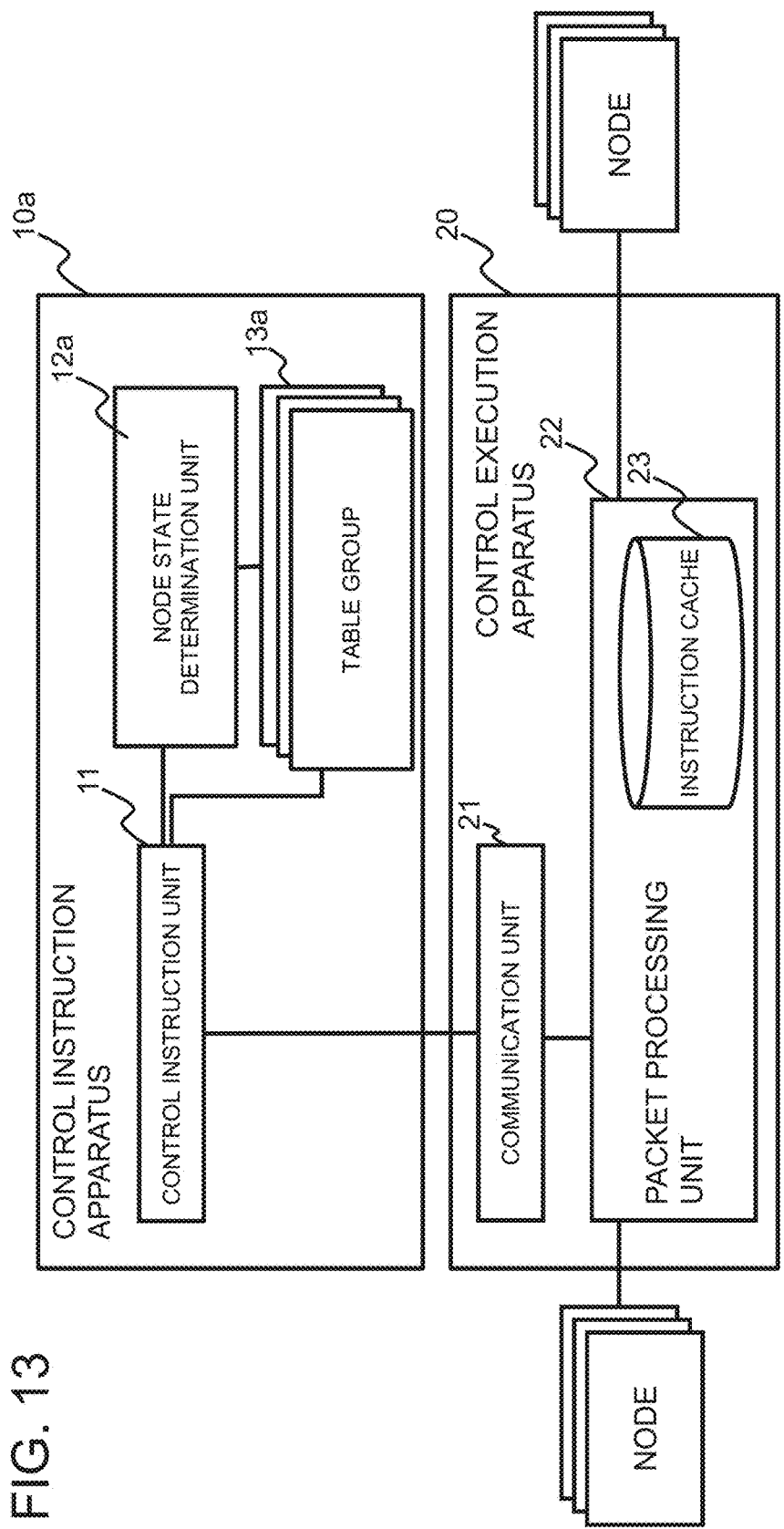
FIG. 13 is a diagram showing a configuration of a communication system in a second exemplary embodiment of the present disclosure.

Continuing, a detailed description is given concerning a second exemplary embodiment of the present disclosure, which enables a more detailed determination as to whether to allow or prohibit communication, making reference to the drawings. FIG. 13 is a diagram showing a configuration of a communication system in the second exemplary embodiment of the present disclosure. Referring to FIG. 13, compared with the first exemplary embodiment, a modification is added to the configuration on a control instruction apparatus 10a side, and instead of the communication history management unit 13, there are provided a table group 13a storing node state determination information and access control policy, in addition to communication history. In the first exemplary embodiment, the node state determination unit 12 determined a server state if a node accepted a connection, and a client state if there was a connection made from the node in question to another node, but the second exemplary embodiment is different in that a determination is made as to node state or accessibility by referring to the table group 13a. A description is given below centered on points of difference from the first exemplary embodiment.

The description below cites an example provided with 3 tables, as the table group 13a. It is to be noted that the number of tables is not limited to 3, and modification is possible, giving consideration to content of required determinations or ease of management of respective tables, and the like.

A first table is a table holding communication history equivalent to the communication history management unit 13 of the first exemplary embodiment (see FIG. 2).

A second table is a table that stores policies generated in advance in order to a determine node state from information of a header or the like of a received packet, in addition to determining a node state according to the first table. FIG. 14 is an example of the second table. In the example of FIG. 14, an entry is stored that determines a node state based on a service or protocol identifier included in the header of the packet transmitted by a node. For example, in a case where communication related to a certain service (Service a) occurs and there is an inquiry concerning processing content of the first packet thereof from the control execution apparatus 20, the first entry in FIG. 14 indicates that the control instruction apparatus 10a determines a node specified as a transmission destination thereof, to be in a "server state". In the same way, in a case of an inquiry concerning processing content for a packet with respect to a service (Service a), the second entry in FIG. 14 indicates that the control instruction apparatus 10a determines a node specified as a transmission source thereof, to be in a "client state". It is to be noted that FIG. 14 is merely an example, and it is also possible to perform a more detailed determination by adding a field as appropriate. By using such tables, it is possible to determine the state of a node according to what type of service or protocol communication it is attempting to start or receive. In the example of FIG. 14, an entry is stored that determines either of a server state or a client state, but it is also possible to add an entry that sets a condition determining the state of "neither a server state nor a client state".

It is also possible to set meta information in an entry of the first table enabling usage as a key when searching the second table, and to enable searching the second table by using the research result of the first table. By so doing, if particular nodes are combined, a key "Priority=1" is obtained, and it is possible to carry out detailed determination by searching an entry where "Priority=1" at a time of searching the second table.

A third table is a table storing access control rules generated in advance in order to determine whether or not communication is possible between nodes set as a transmission source and a transmission destination. FIG. 15 is an example of the third table. In the example of FIG. 15, an entry determining accessibility is stored, based on a combination of nodes set as a transmission source and a transmission destination. For example, the first entry of FIG. 15 indicates that access is prohibited from a node with identifier of Host "a" to a node with identifier of Host "b". Similarly, the second entry of FIG. 15 indicates that access is allowed from an arbitrary node (* represents a wildcard) to a node with identifier of Host "c". Similarly, the third entry of FIG. 15 indicates that access is allowed from a node with identifier of Host "d" to an arbitrary node (* represents a wildcard).

It is to be noted that in FIG. 15 an example was cited in which a determination of accessibility is made using a node identifier, but it is also possible for example, as shown in FIG. 16, to use a table to determine accessibility between nodes, using a set of node addresses (IP address in the example of FIG. 16). It is to be noted that in FIG. 15 and FIG. 16, it is also possible to perform a more detailed determination by adding a field with a service or protocol identifier as a condition.

The node state determination unit 12a of the control instruction apparatus 10a of the present exemplary embodiment refers to a table as described above to make a decision concerning node state and a determination of accessibility. Specifically, in the first exemplary embodiment, making connections was uniformly prohibited when in a server state, and accepting connections was uniformly prohibited when in a client state, but in the second exemplary embodiment, the node state determination unit 12a determines node state according to the first and second tables, and determines accessibility using the third table.

The node state determination unit 12a determines node state according to the second table, after a determination of node state based on a communication record of the first table. The node state determination unit 12a determines if a target node is in a server state or in a client state, in accordance with a relevant entry in these 3 tables. It is to be noted that there may be a case where there is a difference in node state determination result according to the first table and the second table (for example, due to a new communication, a determination of "state of neither client nor server" in the first table, "server state" in the second table, etc.), but in this case a decision may be made in advance to give priority to one thereof.

Furthermore, the node state determination unit 12a of the present exemplary embodiment confirms whether or not communication is admitted between a transmission source and transmission destination of a packet for which an inquiry concerning processing content was received from the control execution apparatus 20, in the third table.

In addition, the control instruction unit 11 of the present exemplary embodiment gives a response to the control execution apparatus 20 based on a determination result by the abovementioned node state determination unit 12a. Accordingly, in the first exemplary embodiment access control was performed only for node state, but in the second exemplary embodiment it is possible, for example, to perform an operation of prohibiting communication even with a combination where communication is allowed with a determination according to node state, and conversely, an operation of allowing communication even with a combination where communication is prohibited with a determination according to node state.

Figure 17:
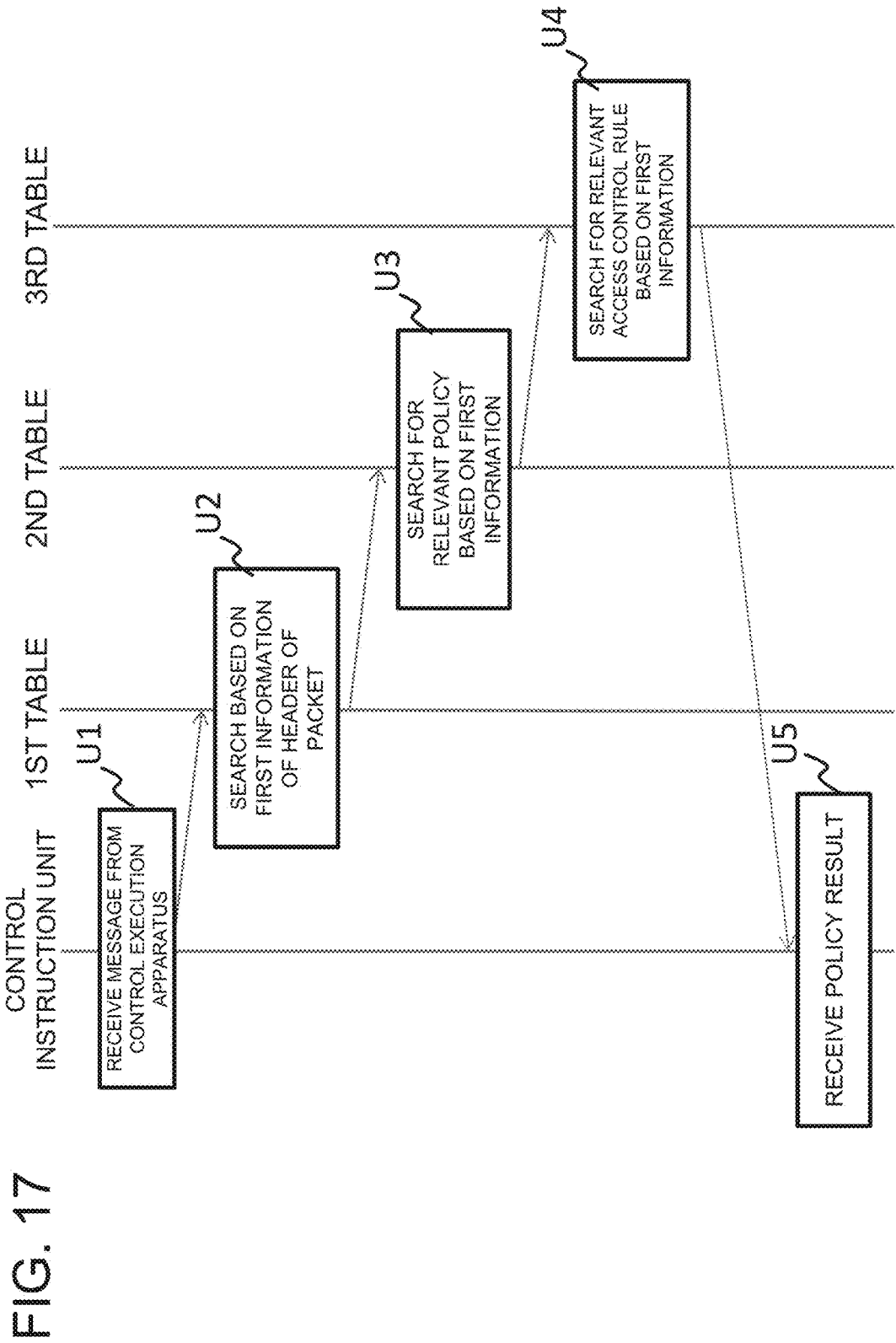
FIG. 17 is a sequence diagram representing detailed operations when a message is received by the control instruction apparatus of the second exemplary embodiment of the disclosure.

Continuing, a detailed description is given concerning operations of the present exemplary embodiment, making reference to the drawings. FIG. 17 is a sequence diagram representing processing flow when a message with an inquiry about packet processing content is received from the control execution apparatus by the control instruction apparatus of the second exemplary embodiment of the disclosure. It is to be noted that node configuration and packet names used in the following description are the same as in FIG. 5, and operations outside of the control instruction apparatus are the same as the first exemplary embodiment.

Referring to FIG. 5 and FIG. 17, first, when the node state determination unit 12a of the control apparatus 10a receives a message inquiring about processing content from the control execution apparatus 20 (step U1), confirmation is made as to whether there is a relevant entry already in the first table, based on header information of a received packet (step U2). Next, the node state determination unit 12a searches for an entry matching a received packet from the second table, using information obtained from the first table as necessary, and confirms the state of a transmitting node and a receiving node for packet B (step U3). Furthermore, the node state determination unit 12a refers to the third table to confirm whether or not communication is possible between transmission source and transmission destination nodes, including exception processing of respective nodes (step U4). The node state determination unit 12a transmits a result of the abovementioned determination to the control instruction unit 11, and the control instruction unit 11 that receives this content requests processing with regard to the control execution apparatus (step U5).

According to the second exemplary embodiment of the present disclosure as described above, access control and exception processing can be performed for each user, based not only on node state as in the first exemplary embodiment but also on connection information received by a certain node.

It is to be noted that in the abovementioned example, since a search may be made of the second table using information obtained from the first table, table reference order is fixed, but in a case where search for a relevant entry is possible from respective tables using only received packet information, there is no constraint on the abovementioned table reference order and it is possible to make changes as appropriate.

Third Exemplary Embodiment

Continuing, a description is given concerning a third exemplary embodiment of the present disclosure, in which functions equivalent to the first exemplary embodiment are implemented, using a more specific configuration. In the following description, an OpenFlow controller (below, "control apparatus") is used as a control instruction apparatus 11, and an OpenFlow switch (below, "switch") is used as a control execution apparatus. An instruction cache 23 of the control execution apparatus 20 can be realized by a flow table of an OFS (see Non-Patent Literature 2).

Figure 18:
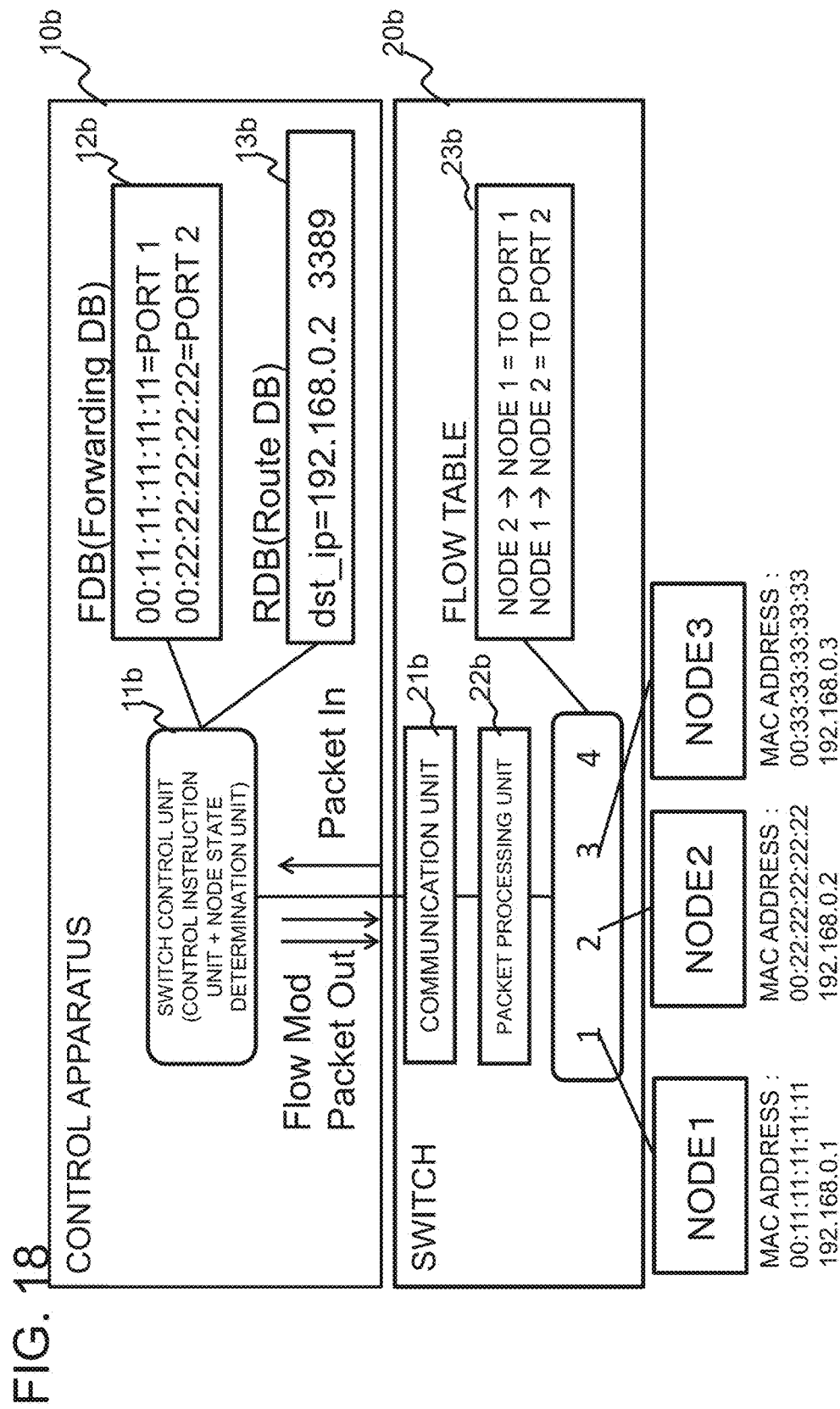
FIG. 18 is a diagram showing a configuration of a communication system in a third exemplary embodiment of the present disclosure.

FIG. 18 is a diagram showing a configuration of a communication system in the third exemplary embodiment of the present disclosure. FIG. 18 shows a control apparatus 10b, a switch 20b and a node group. The control apparatus 10b is provided with a Forwarding DB (below, "FDB") 12b that accumulates position information of respective nodes connected to the switch, a Route DB (below, "RDB") 13b that accumulates communication history by recording a transmission destination IP address and port number of a received packet, and a switch control unit 11b that determines whether or not communication is possible based on node state which is based on the information, and that gives an instruction to the switch 20b.

The switch 20b is provided with, in addition to a communication unit 21b and a packet processing unit 22b, a flow table 23b for holding flow entries, corresponding to the instruction cache 23 described above. The flow table 23b stores match conditions that match received packets, and entries that determine processing content to be applied to a packet conforming to a match condition. On receiving a packet, the packet processing unit 22b retrieves an entry having a match condition conforming to the received packet from the flow table 23b, and executes processing content (packet forwarding, header rewriting, packet dropping, etc.) as determined in the retrieved entry.

Here, in a case of receiving an ARP (Address Resolution Protocol) from the switch 20b, the control apparatus 10b updates only the FDB 12b that records position information of respective nodes linked to the switch 20b, and the RDB 13b is not updated. In this way, the switch 20b does not perform updating of the flow table 23b when an ARP packet is received.

Figure 19:
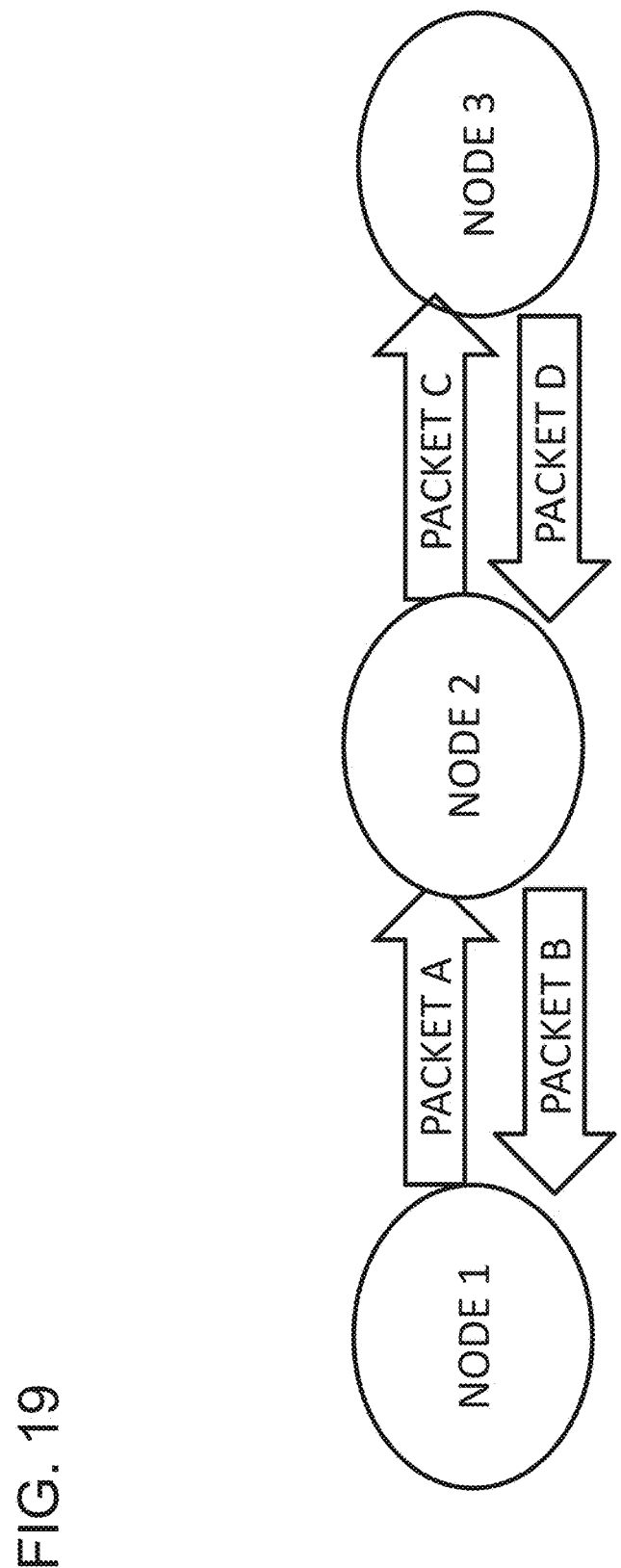
FIG. 19 is a diagram for describing relations of nodes 1 to 3 in the third exemplary embodiment of the disclosure.

Continuing, a detailed description is given concerning operations of the present exemplary embodiment, making reference to the drawings. In the following description, an example describes a situation where remote login is performed to node 2 from node 1 in FIG. 19, and thereafter node 3 is accessed. At this occasion, packets are named A to D as shown in FIG. 19. It is to be noted that RDP (Remote Desktop Protocol) is used as a protocol for remote login.

Figure 20:
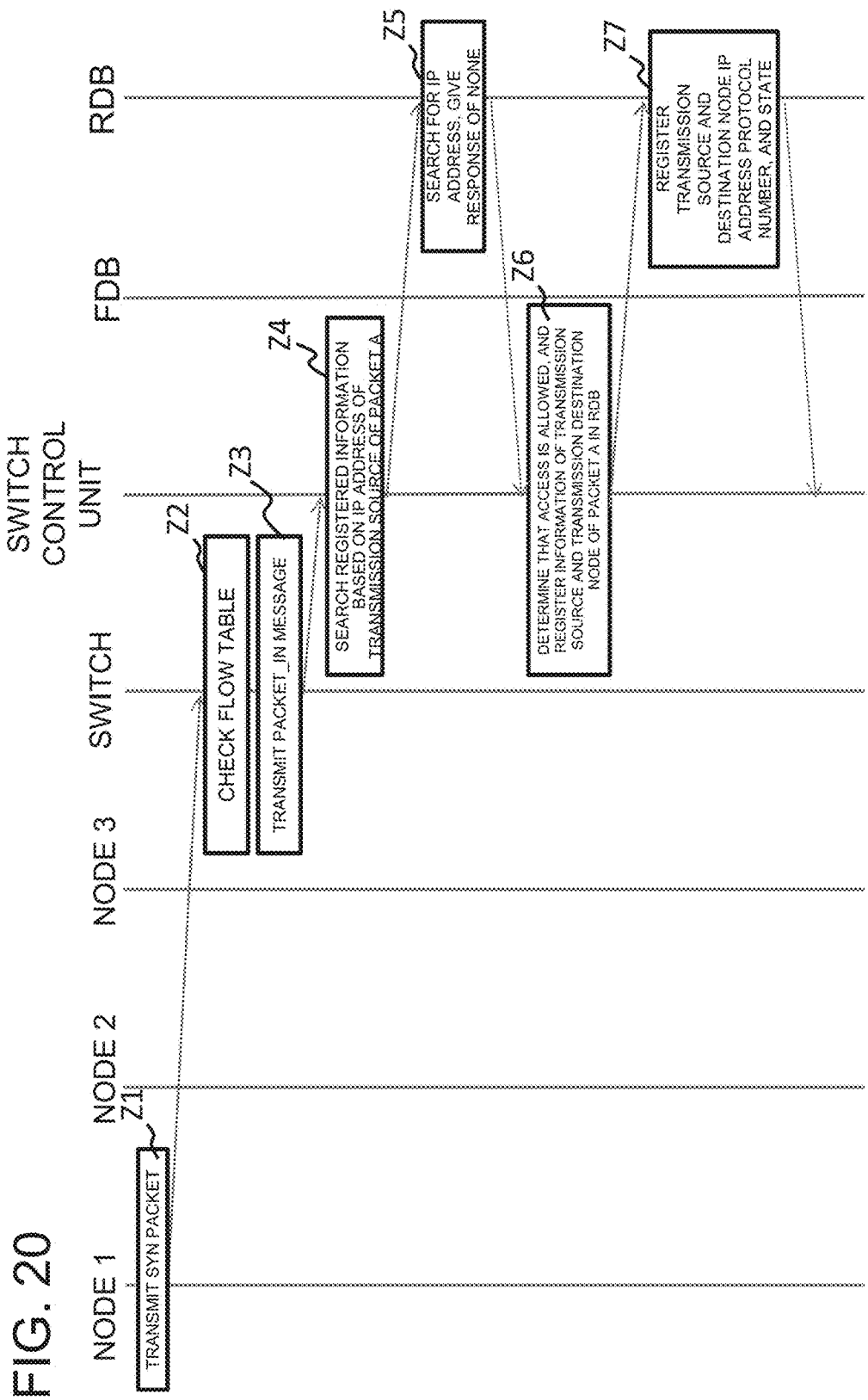
FIG. 20 is a sequence diagram representing overall operations of a communication system in the third exemplary embodiment of the disclosure.

FIG. 20 is a sequence diagram representing overall operations of a communication system in the third exemplary embodiment of the disclosure. First, when node 1 initially transmits a SYN packet (here, packet A) to node 2 (step Z1), switch 20b confirms whether or not there is a relevant flow entry in the flow table 23b (step Z2).

Here, in a case where a flow entry matching packet A is found, switch 20b sends a packet to a port of switch 20b to which node 2 is connected. On the other hand, in a case where a flow entry matching packet A is not found, switch 20b transmits packet A using a Packet-in message to the control apparatus 20b (step Z3).

The switch control unit 11b of the control apparatus 10b that receives the Packet-in message confirms whether or not the transmission source IP address of packet A (IP address of node 1 in the present example) is registered in the RDB 13b (step Z4). Here, in a case where there is a relevant entry, the switch control unit 11b obtains a TCP port number described in the relevant entry, and makes a determination of node state (a description of this is given in FIG. 22).

On the other hand, in a case where there is no relevant entry in the RDB 13b, since there is no entry of a relevant IP address (communication history) in the RDB 13b, a determination is made that nodes 1 and 2 are in neither a server state nor a client state, and access is prohibited. The switch control unit 11b registers, in the RDB 13b, the IP address and port number of node 1, which is the transmission source of packet A, and the IP address and port number of node 2, which is the transmission destination of packet A (steps Z6, Z7).

After registering in the RDB 13b, the switch control unit 11b makes an inquiry to the FDB 12b concerning port number of switch 20b to which the transmission destination switch for packet A is connected (step Z8). The FDB 12b searches for the port number of switch 20b with respect to transmission destination MAC address of packet A (MAC address of node 2). It is to be noted that in a case where there is no relevant port number in the FDB 12b, the switch control unit 11b performs flooding by packet transmission from all port numbers of switch 20b, and delivers the packet to node 2.

On the other hand, in a case where there is a port number corresponding to the transmission destination MAC address of packet A in the FDB 12b (step Z9), the switch control unit 11b instructs switch 20b to transmit a packet from a port to which node 2 is connected, by a Packet-out message. Furthermore, the switch control unit 11b instructs switch 20b to add an entry determining the transmission destination of packet A to the flow table 23b, by a Flow-mod message (step Z10). When an entry is added to the flow table 23b, it is also possible to register a reverse direction flow entry (from node 1 to node 2, transmitted to port number B), along with a currently allowed flow entry (from node 2 to node 1, transmitted to port number A). This is to prevent a response packet from node 2 to node 1 not being delivered due to access control making reference to RDB 13b, after an RDP packet has been transmitted from node 1 to node 2.

The switch 20b that receives a Packet-out message transmits packet A from the relevant port number described in FDB 12b with destination of node 2 (step Z11).

Node 2 that receives packet A returns a SYN/ACK packet (packet B) with respect to packet A (step Z12). In the same way as with packet A, switch 20b confirms its own flow table 23b (step Z13). Since at this time a flow entry, which was generated when packet A was being exchanged, is registered, switch 20b does not transmit Packet-in to the control apparatus 10b, but transmits packet B from a port specified in the flow entry (step Z14).

By the above operation, remote login from node 1 to node 2 is realized.

Figure 22:
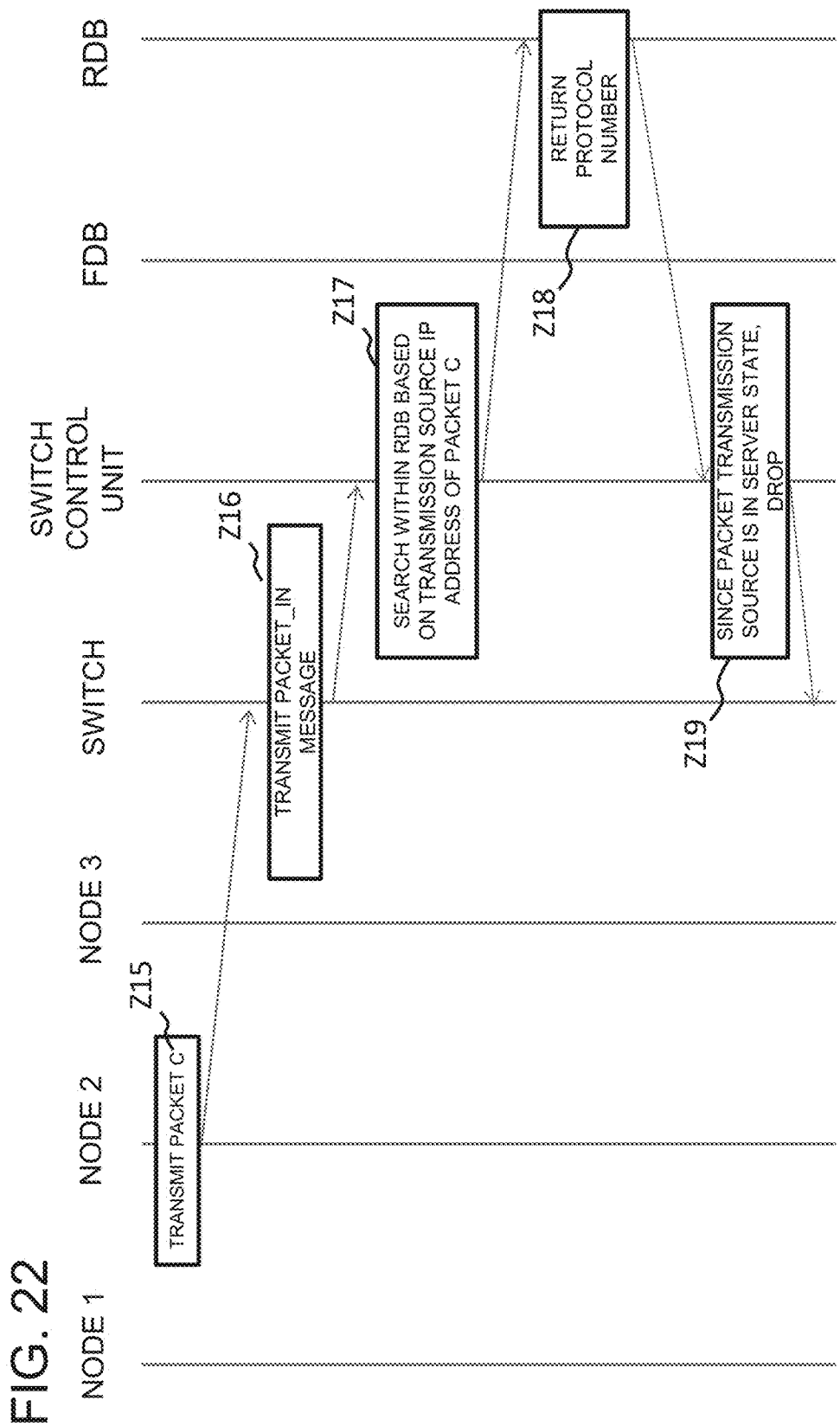
FIG. 22 is a continuity diagram of FIG. 21.

In this state, as shown in FIG. 5, access from node 2 to node 3 is attempted. As shown in FIG. 22, when a packet C is transmitted from node 2 to node 3 (step Z15), the switch control unit 11b of switch 20b confirms whether or not a flow entry to process the packet C is present in the flow table 23b. At this point in time, since a flow entry to process packet A is not registered in the flow table 23b, switch 20b transmits a Packet-in message to the control apparatus 10b (step Z16). The switch control unit 11b of the control apparatus 10b that receives packet C in accordance with the Packet-in message performs search to determine whether or not there is relevant information in the RDB 13b, based on the transmission source IP address of packet C (step Z17). Since "node 2 IP address, 3389 (port number representing RDP)" is described in the RDB 13b at the point in time when packet A is delivered to node 2, a value of 3389 is returned to the switch control unit 11b from the RDB 13b (step Z18). On receiving 3389, the switch control unit 11b determines that node B is in a server state. Since the packet transmission source is in a server state, switch 20b is instructed to drop the packet (step Z19). At this time, it is possible to perform access control by a port number outside of the RDP port number 3389.

By the abovementioned operation, it is possible to prohibit node 2 from becoming a springboard.

It is to be noted that the OpenFlow switch of Non-Patent Literature 2 can give notification that a flow entry has timed out, to the OpenFlow controller (control apparatus 10b), using a Flow-removed message. More specifically, a timeout is set in a flow entry of the flow table 23b of the OpenFlow switch, and when the timeout is established by not receiving a relevant packet in a fixed time period, switch 20b gives notification of timeout by a Flow-removed message to the control apparatus 10b. The control apparatus 10b that receives the Flow-removed message searches for an entry in the RDB 13b based on the packet transmission destination IP address and port number, included in the timeout notification, and executes removal thereof.

Fourth Exemplary Embodiment

Figure 23:
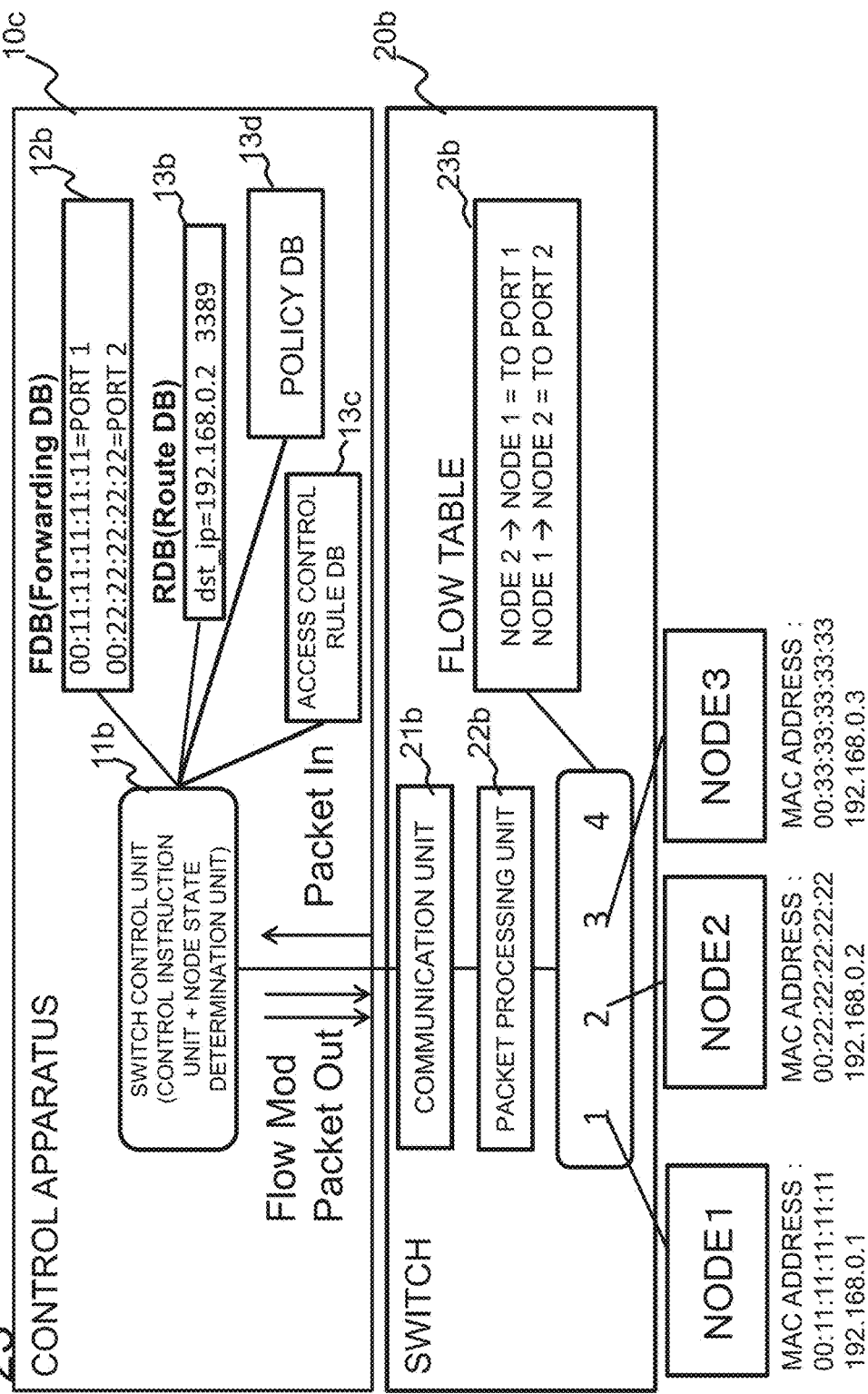
FIG. 23 is a diagram showing a configuration of a communication system of a fourth exemplary embodiment of the present disclosure.

Next, a description is given concerning a fourth exemplary embodiment of the present disclosure, in which functions equivalent to the second exemplary embodiment are implemented, using a more specific configuration. FIG. 23 is a diagram showing a configuration of a communication system in the fourth exemplary embodiment of the present disclosure. Referring to FIG. 23, in addition to the configuration of the first exemplary embodiment, the configuration is such that an access control rule database (access control rule DB) 13c corresponding to the second table, and a policy database (policy DB) 13d corresponding to the second table are added to the control apparatus 10b.

FIG. 24 is a diagram showing an example of a node state determination table held by a policy DB 13d. In the example of FIG. 24, a determination policy is registered, where, if a connection is accepted using port number 3389 (RDP), a server state occurs, and if a connection is made using port number 3389, a client state occurs. A determination as to whether a connection has been accepted or a connection has been established can be made according to whether a relevant IP address is set in a transmission source or is set in a transmission destination (see "src/dst" of FIG. 24).

FIG. 25 is a diagram showing an example of an accessibility determination table held by the access control rule DB 13c. In a case of access from a node with IP address 192.168.0.2 to a node with IP access 192.168.0.3, the first entry from the top in FIG. 25 forms a rule that allows access. It is to be noted that in the present exemplary embodiment, a determination according to the access control rule DB 13c has higher priority than a determination according to the policy DB 13d. By giving this type of priority, even if a node with IP address 192.168.0.2 is already operating in a server state, or a node with IP address 192.168.0.3 is already operating in a client state, control is possible to allow access. Furthermore, * in FIG. 25 indicates all IP addresses, and it is possible to set a rule by which, even if already operating as a client, access to a node with IP address 192.168.0.1 is always allowed (second entry from the top in FIG. 25), or a rule by which, even if already operating as a server, access from a node with IP address 192.168.0.3 is always allowed (third entry from the top in FIG. 18).

Continuing, a detailed description is given concerning operations of the present exemplary embodiment, making reference to the drawings. Below, a detailed description is given regarding a Packet-in message from switch 20b, from after a packet is delivered to the control apparatus 10b, to processing being determined for the received packet, and a Packet-out message and Flow-mod message being transmitted from the control apparatus 10b to switch 20b. It is to be noted that since the packet processing method in switch 20b is the same as in the third exemplary embodiment, a description thereof is omitted.

In the following, a description is exemplified by a situation where remote login is performed to node 2 from node 1 in FIG. 19, and thereafter node 3 is accessed, similar to the third exemplary embodiment. At this occasion, flowing packets are named A to D as shown in FIG. 19. It is to be noted that RDP (Remote Desktop Protocol) is used as a protocol for remote login.

Next, a description is exemplified by a situation where remote login is performed to node 2 from node 1, and thereafter node 3 is accessed by node 2.

Figure 26:
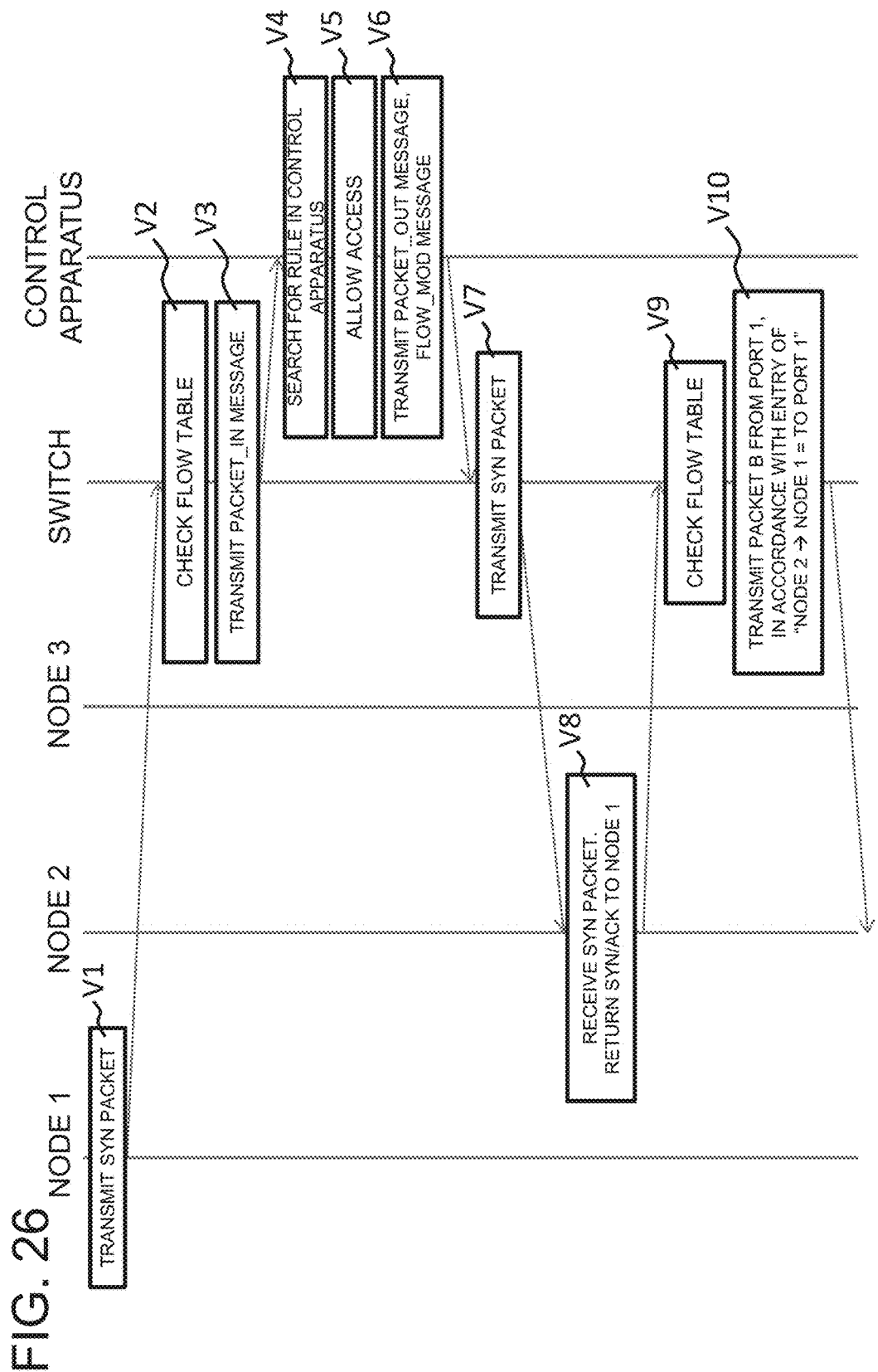
FIG. 26 is a sequence diagram representing overall operations of a communication system of the fourth exemplary embodiment of the disclosure.
Figure 27:
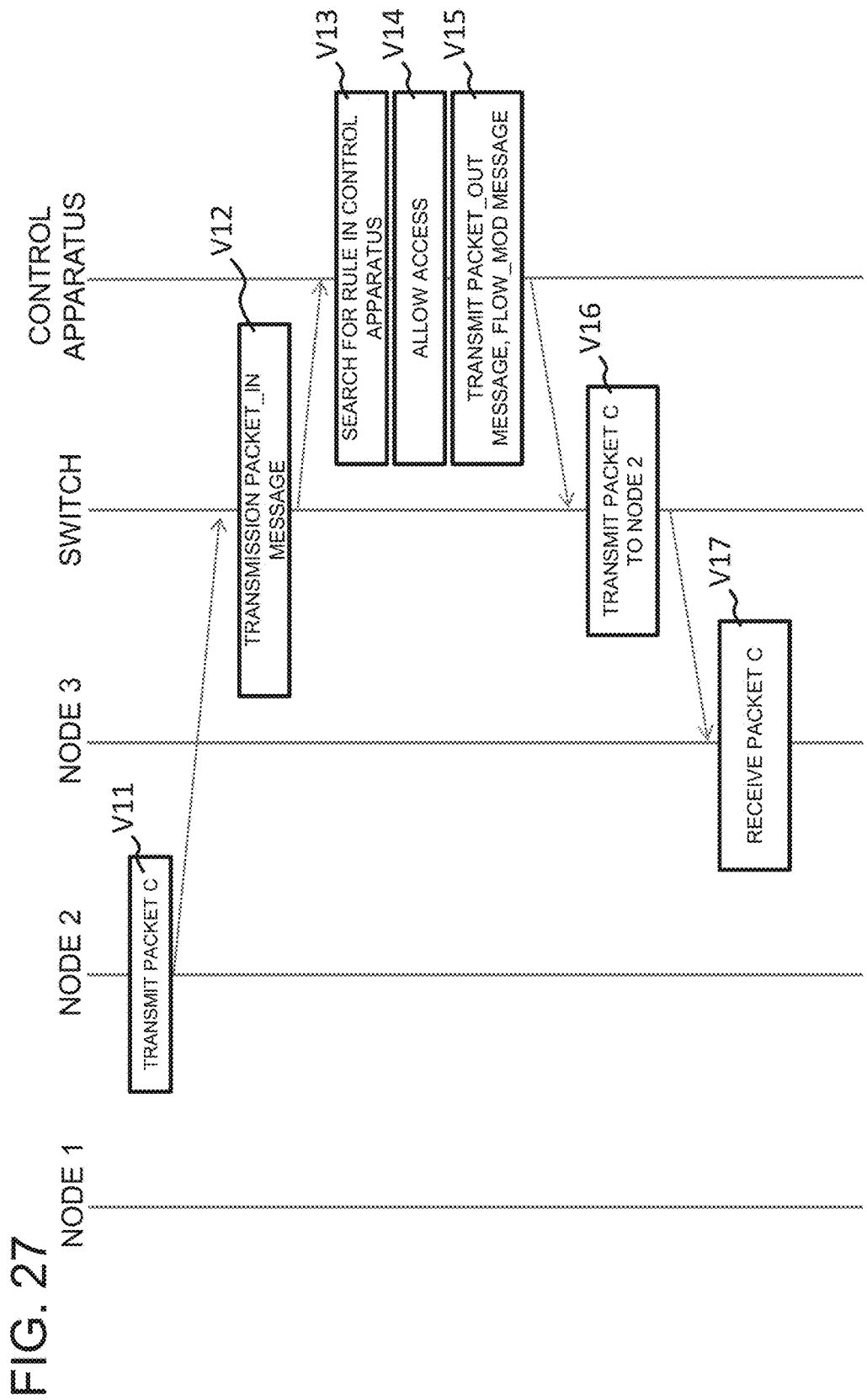
FIG. 27 is a continuity diagram of FIG. 26.

FIG. 26 and FIG. 27 are sequence diagrams representing overall operations of a communication system of the fourth exemplary embodiment of the present disclosure. Step V1 to step V3 in FIG. 26 are similar to steps Z1 to Z3 in FIG. 20 in the third exemplary embodiment.

Figure 28:
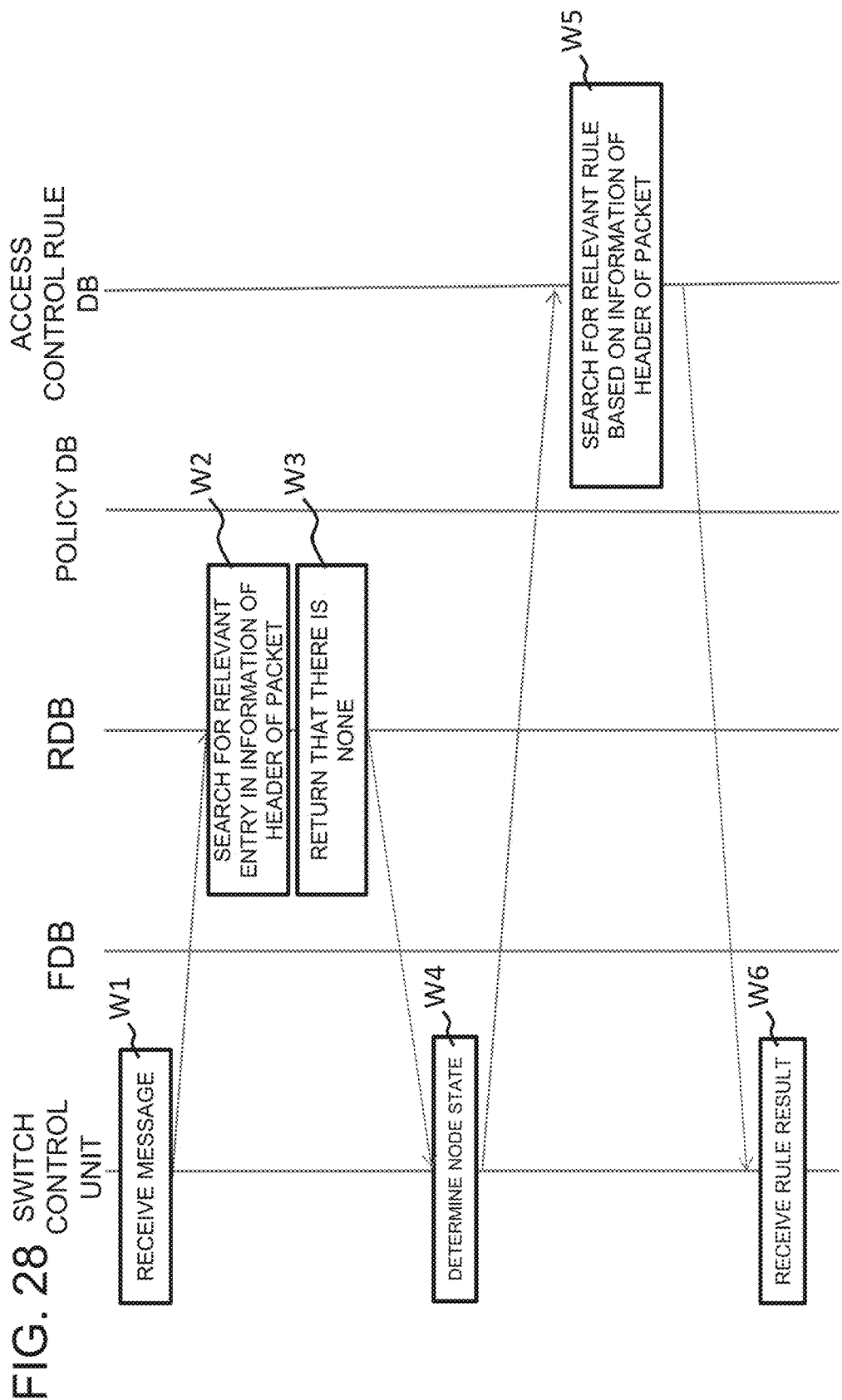
FIG. 28 is a sequence diagram representing detailed operations when a message is received by an OpenFlow controller of the first exemplary embodiment of the disclosure.
Figure 29:
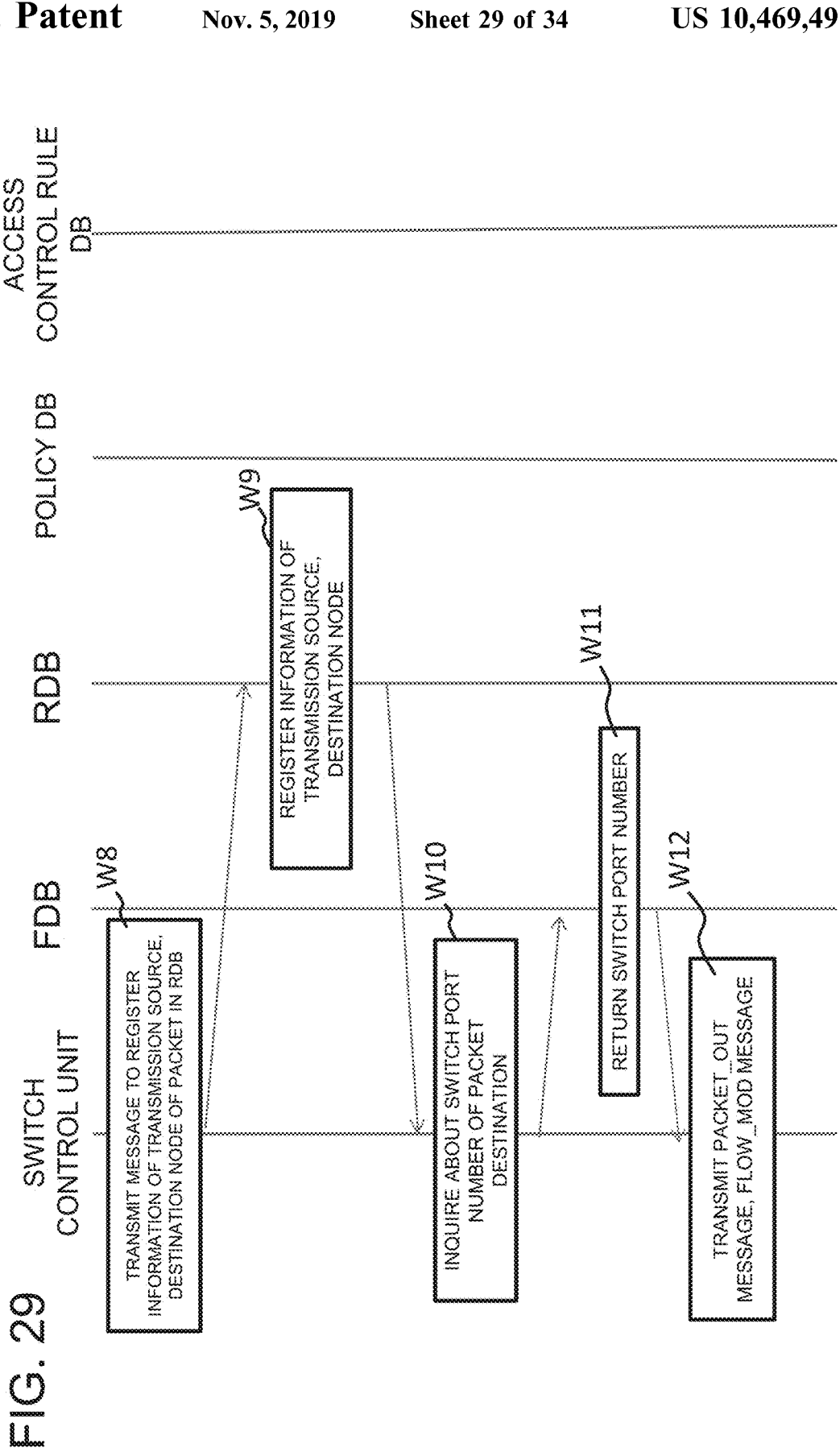
FIG. 29 is a continuity diagram of FIG. 27.

Next, a detailed description is given concerning step V4 and step V5, making reference to FIG. 28 and FIG. 29. On receiving a SYN packet (packet A) through a Packet-in message (step W1), the switch control unit 11b searches for an entry matching a port number in the header of the relevant packet A, and either a transmission source IP address or a transmission destination IP address, from the RDB 13b (step W2). At this point in time, since there is no entry corresponding to the abovementioned SYN packet in the RDB 13b, the switch control unit 11b receives a response that there is no entry describing the relevant IP address, from the RDB 13b (step W3). The switch control unit 11b does not refer to the policy DB 13d, but determines that neither node 1 nor node 2 are in a client state or a server state (step W4).

Next, the switch control unit 11b searches for a rule to be applied to nodes indicated in the transmission source IP address, transmission destination IP address of the SYN packet (packet A), from the access control rule DB 13c (step W5). If rules as in FIG. 25 are stored in the access control rule DB 13c, there is no rule present that matches the abovementioned SYN packet. Accordingly, the switch control unit 11b receives, from the access control rule DB 13c, a response that a relevant rule is not present (step W6).

As a result of the above, the switch control unit 11b determines that transmission and reception of packet A are possible, as shown in FIG. 29, and transmits a message to register an entry corresponding to the abovementioned SYN packet, to the RDB 13b (step S8), and registers an entry associating either the transmission source IP address or the transmission destination IP address of the abovementioned SYN packet, and port number (step W9, step V5).

Figure 21:
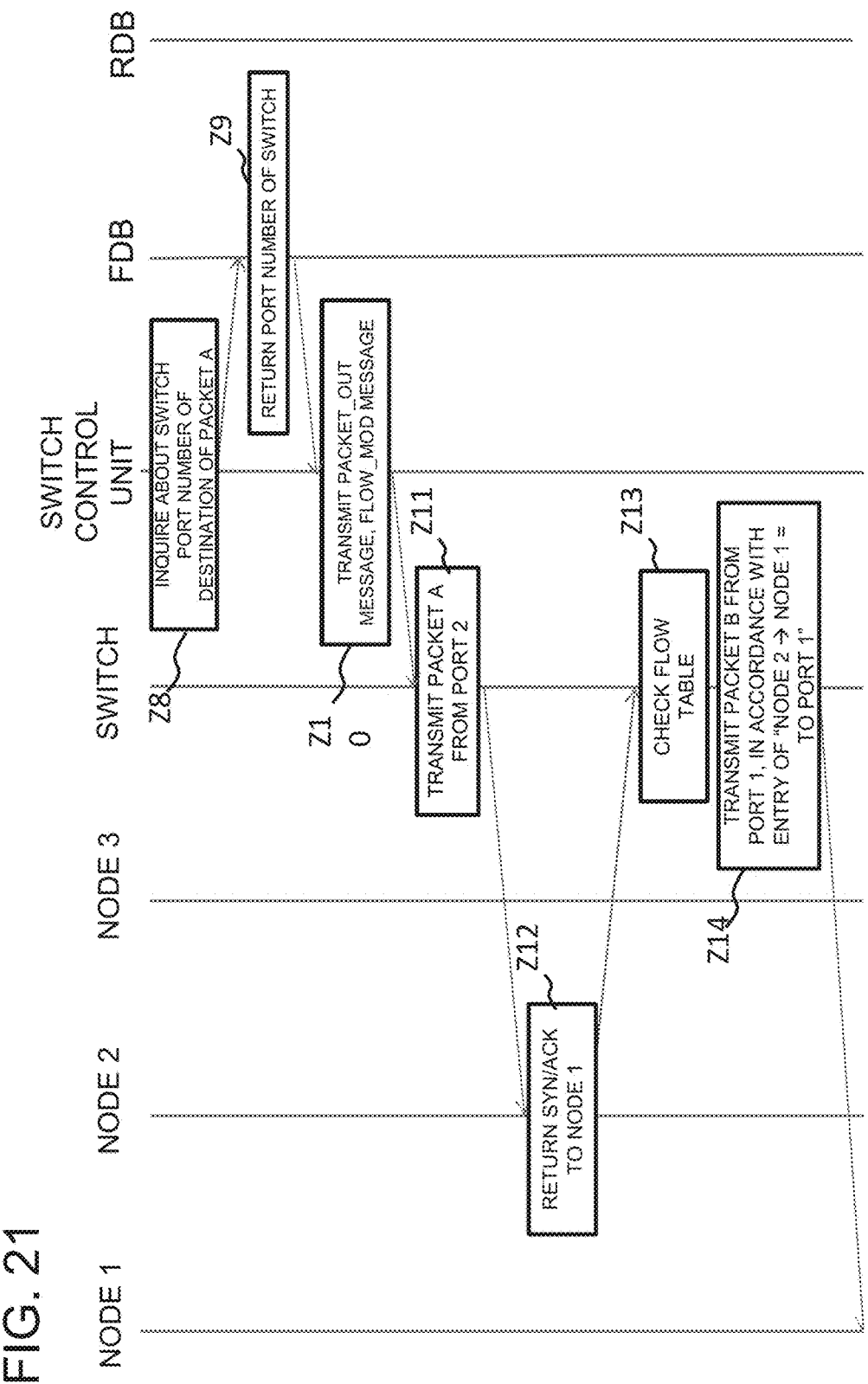
FIG. 21 is a continuity diagram of FIG. 20.

Below, since step W10 to step W12 in FIG. 29, and step V6 to step V12 in FIG. 26 to FIG. 27, are respectively similar to step Z8 to step Z10 and step Z11 to step Z16 in FIG. 21 and FIG. 22 of the third exemplary embodiment, a description is omitted.

Figure 30:
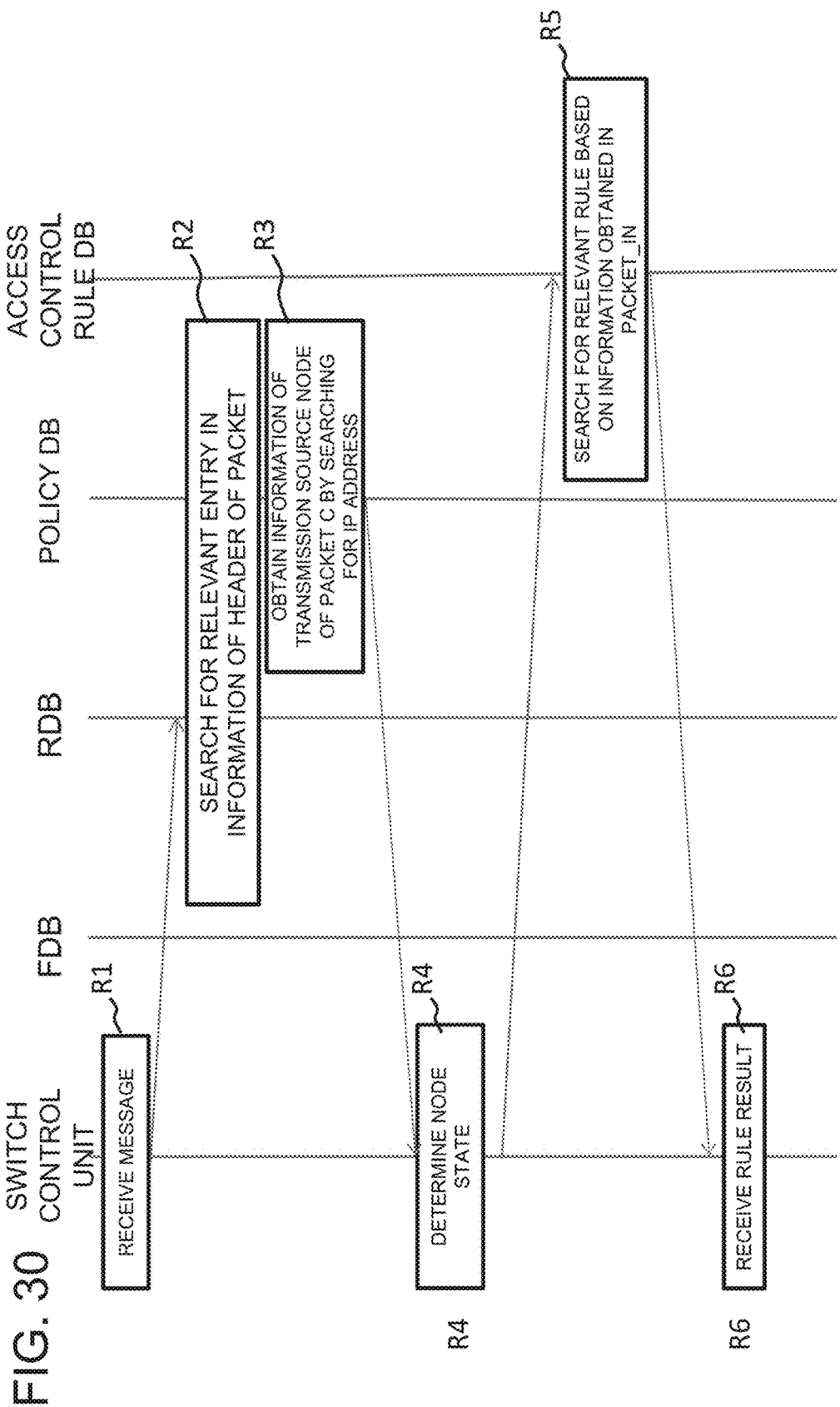
FIG. 30 is a sequence diagram representing detailed operations when a message is received by an OpenFlow controller of the first exemplary embodiment of the disclosure.

A detailed description is given, among operations in a case where node 2 transmits a packet C thereafter, concerning step V13 to step V15 in FIG. 27, making reference to FIG. 30. First, a description is given concerning step V13 in FIG. 27. On receiving a packet C from switch 20b through a Packet-in message (step R1), the switch control unit 11b searches for an entry corresponding to the transmission source and transmission destination IP address of a packet C from the RDB 13b (step R2). At this point in time, since an entry corresponding to the SYN packet was already registered in the previous step W9 of FIG. 29, since information of node 2 is registered in RDB 13b, a port number and information that the IP address of node 2 is a transmission destination are obtained from the RDB 13b. Meanwhile, concerning node 3, it is understood that there is no relevant entry present in the RDB 13b. Furthermore, the switch control unit 11b searches for an entry corresponding to port number and information that the IP address of node 2 is the transmission destination, from the policy DB 13d. From the above result, the switch control unit 11b determines that node 2 is operating in a server state, and node 3 is neither in a client state nor a server state (step R4; see the first entry in the policy DB 13d of FIG. 24).

Next, the switch control unit 11b searches for a rule to be applied to nodes indicating transmission source IP address, transmission destination IP address of packet C, from the access control rule DB 13c, and confirms whether the relevant rule is present (step R5). As a result thereof, a response is given of a rule allowing access from 192.168.0.2 (IP address of node 2) to 192.168.0.3 (IP address of node 3), shown in FIG. 25.

As a result of the above, although node 2 is in a server state, the switch control unit 11b gives priority to an access control rule allowing communication between node 2 and node 3, and determines that access be allowed. Furthermore since it is ascertained that node 3 is not registered in the RDB 13b by step R4, the switch control unit 13b transmits a message to register information of node 3 in the RDB 13b as shown in FIG. 31 (step R7), and registers an entry associating port number and IP address of node 3 as a transmission destination IP address (step R8, step V14).

Figure 31:
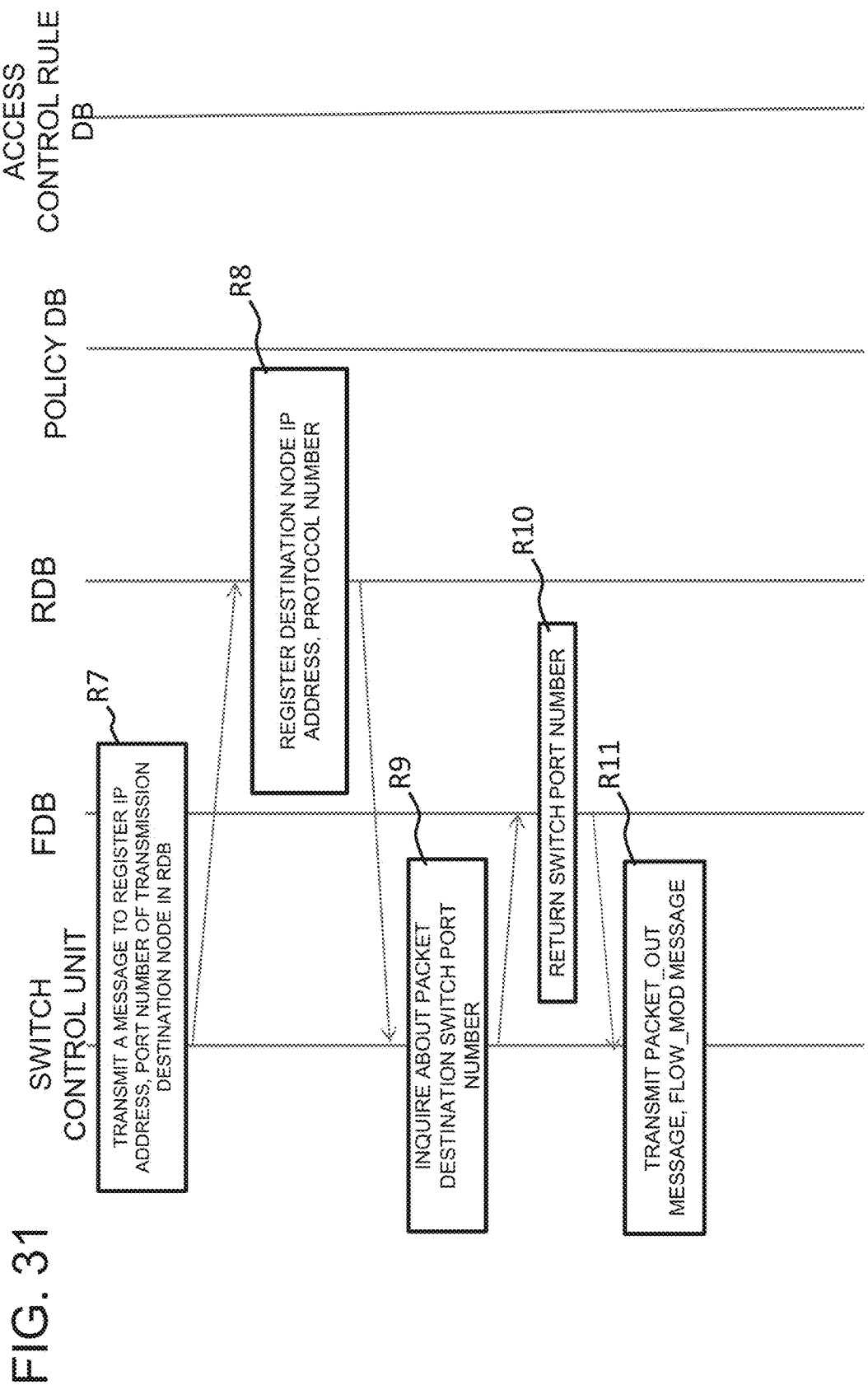
FIG. 31 is a continuity diagram of FIG. 27.

Since subsequent steps R9 to R11 in FIG. 31 are similar to steps W10 to W12 in FIG. 29, a description is omitted. Continuing again with a description referring to FIG. 27, the switch control unit 11b transmits a Packet-out message instructing the switch 20b to transmit packet C by a port to which node 3 is connected, and a Flow-mod message instructing that a flow entry be registered in a flow table 23b (step V15).

The switch 20b that receives the respective messages transmits packet C to node 3 (step V16). In this way, packet C, which could not be transmitted from node 2 in the first exemplary embodiment, reaches node 3 in the second exemplary embodiment (step V17).

As described above, in the present exemplary embodiment, since application priority is given to an access control rule rather than a determination of node state according to the RDB 13b and policy DB 13d, in a case where the access control rule DB 13c has rules as shown in FIG. 32, for example, access from node 1 to node 2 is denied at the point in time of step V5. Accordingly, even in a case where both node 1 and node 2 are not already in a client/server state, it is possible to not establish a connection (SYN packet is dropped).

Clearly, it is also possible to give priority to a determination according to node state by RDB 13b and policy DB 13d, rather than an access control rule.

Fifth Exemplary Embodiment

Figure 33:
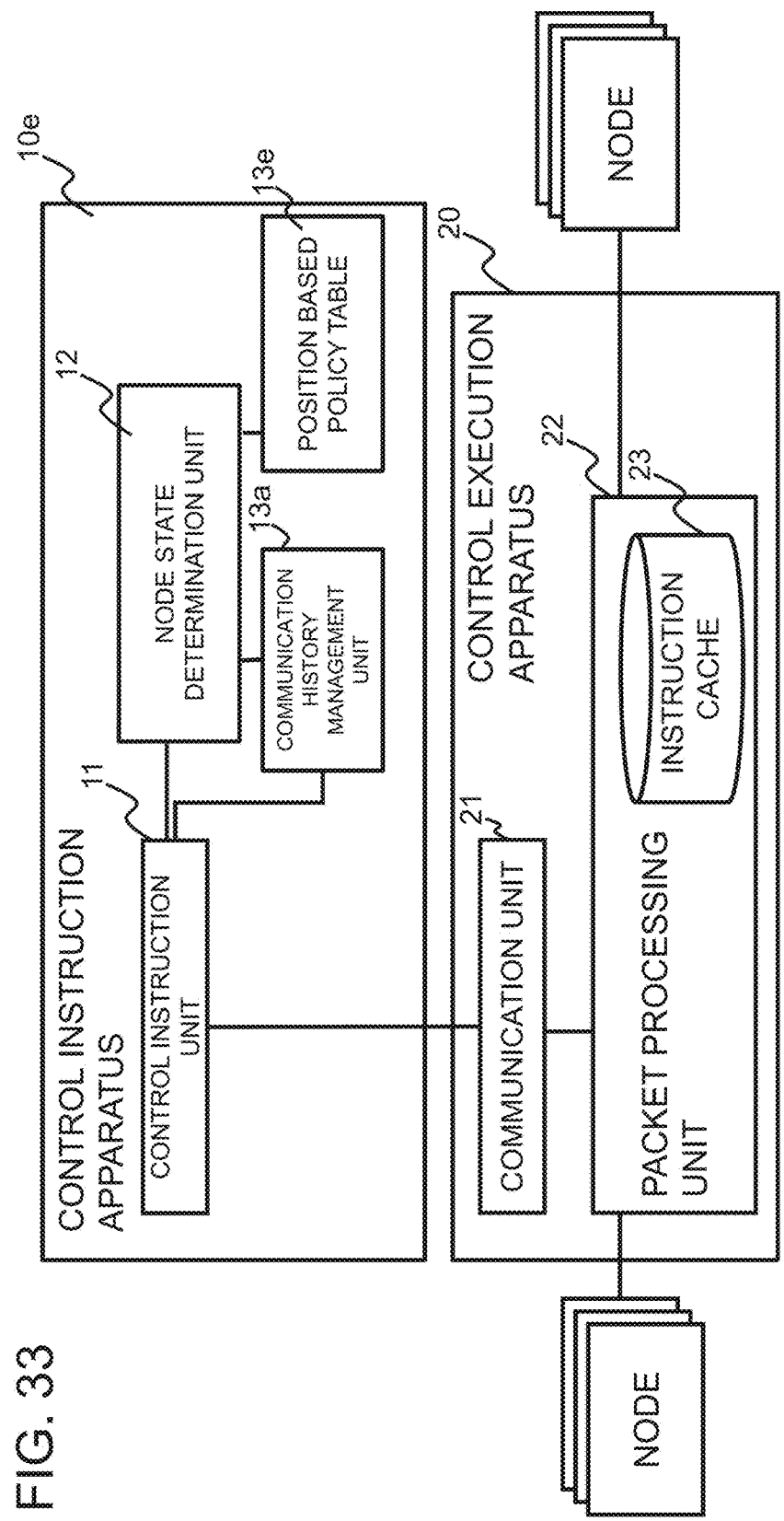
FIG. 33 is a diagram showing a configuration of a communication system in a fifth exemplary embodiment of the present disclosure.

Next, a description is given concerning a fifth exemplary embodiment of the present disclosure in which node state is determined, combined with usage of position information. FIG. 33 is a diagram showing a configuration of a communication system in the fifth exemplary embodiment of the present disclosure. Referring to FIG. 33, in addition to the configuration of the first exemplary embodiment, the configuration has a position based policy table 13e added to a control instruction apparatus 10e. Since the configuration otherwise is the same as in the first exemplary embodiment, a description is given below centered on points of difference.

Figure 34:
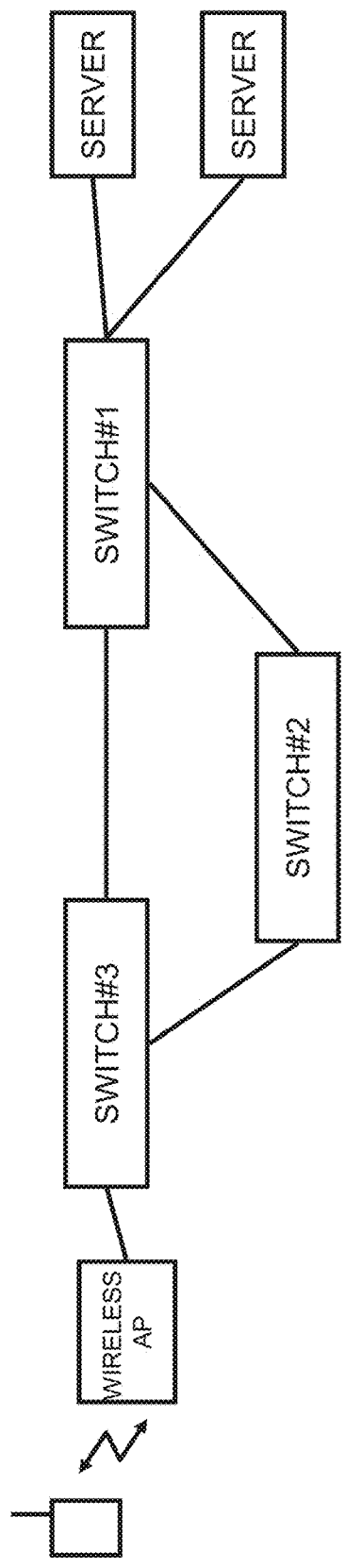
FIG. 34 is a diagram for describing processing to determine a node state by a control instruction apparatus of the fifth exemplary embodiment of the disclosure.

FIG. 34 is a diagram for describing processing to determine node state by the control instruction apparatus of the fifth exemplary embodiment of the disclosure. The upper part of FIG. 34 is an example of the position based policy table 13e. The first and second entries from the top in FIG. 34 represent a policy in which nodes connected to node #1 of switch #1 are determined to be in a server state, irrespective of communication history, as shown in the bottom part of the diagram. The first to third entries from the bottom of the upper part represent a policy in which nodes connected to switch #3 via a wireless AP are determined to be in a client state, irrespective of communication history. In the example of FIG. 34, switch #2 for which a node attribute cannot be uniquely determined by a switch, has a node state of "Any".

According to the control instruction apparatus 10e in the present exemplary embodiment as above, it is possible to make a determination of a node combining with usage of node position. By giving superiority order to determinations by communication history and the position based policy table 13e, even for a node at a position to be determined as being in a server state according to the position based policy table 13e, for example, it is possible to judge a client state in a case with a particular communication history. Conversely, even where a node is at a position to be determined as being in a server state according to communication history, for example, it is possible to judge a client state in a case with a particular position. Only in a case where a node state is indefinite: "Any", according to the position based policy table 13e, it is possible to make a determination according to communication history.

Or, only in a case of a match of a determination by the position based policy table 13e and a determination according to communication history, it is possible to judge a node as being in a server state or a client state, and otherwise, to make a determination of being in neither a server state nor a client state.

In the fifth exemplary embodiment described above, it is clearly possible to make a determination according to an access control rule described in the second and fourth exemplary embodiments.

A description has been given above of preferable exemplary embodiments of the present invention, but the technical scope of present invention is not limited to the respective exemplary embodiments described above. For example, in the third and fourth exemplary embodiments described above, a description was given using an OpenFlow control apparatus (controller) and switch of Non-Patent Literature 1 and 2, but it is sufficient if the control apparatus and control execution apparatus have functionality equivalent thereto.

Finally, preferred modes of the present invention are summarized.

[First Mode]
(Refer to the communication system according to the first aspect described above.)

[Second Mode]
The communication system according to the first mode, wherein the node state determination unit further determines whether or not a node that is a transmission source or a transmission destination of a packet for which an inquiry concerning a processing method was received, is on a side that requests provision of a service with respect to another node, and the control instruction unit prohibits, in a case where the node is on the side that requests provision of a service with respect to another node, new communication from the other node to the node in question.

[Third Mode]
A communication system including a control execution apparatus provided with a communication unit that makes an inquiry concerning packet processing method, with respect to a prescribed control instruction apparatus, and a packet processing unit that processes packets, based on an instruction from the control instruction apparatus; and the control instruction apparatus that is provided with a communication history management unit that manages communication history between nodes via the control execution apparatus, a node state determination unit that determines, making reference to the communication history of the communication history management unit, whether or not a node that is a transmission source or a transmission destination of the packet for which the inquiry concerning a processing method was received, is on a side that requests provision of a service with respect to another node, and a control instruction unit that prohibits, when at least the node is on the side that requests provision of a service to another node, new communication from the other node to the node in question.

[Fourth Mode]
The communication system according to any one of the first to third modes, further provided with an access control rule storage unit that stores access control rules to be applied to communication between nodes, wherein a determination is made as to whether or not to prohibit the new communication, based on whether or not communication is possible according to the node state and the access control rule.

[Fifth Mode]
The communication system according to any one of the first to fourth modes, further provided with a node state determination table to determine whether or not the position of the node is on a side that provides a service to the other node, wherein the node state determination unit, by referring to position information of the node in addition to communication history of the communication history management unit, determines the node state.
[Sixth Mode]
The communication system according to any one of the first to fourth modes, further provided with a node state determination table to determine whether or not the position of the node is on a side that provides a service to the other node, wherein the control instruction unit, in a case where the node position is at a prescribed position, prohibits new communication from the node in question to another node, irrespective of a determination result of the node state determination unit.
[Seventh Mode]
The communication system according to any one of the first to fourth modes, further provided with a node state determination table to determine whether or not the position of the node is on a side that provides a service to the other node, wherein the control instruction unit, in a case where the node position is at a prescribed position, prohibits new communication from the other node to the node in question, irrespective of a determination result of the node state determination unit.
[Eighth Mode]
The communication system according to any one of the first to seventh modes, wherein the node state determination unit analyses a packet for which an inquiry concerning the processing method has been received, and based on whether a transmission source node has transmitted a connection request or has accepted a connection, determines the state of the node.
[Ninth Mode]
The communication system according to any one of the first to eighth modes, wherein the control execution apparatus is provided with a table that stores control instructions set by the control instruction apparatus, wherein the packet processing unit executes packet processing based on an instruction from the control instruction apparatus, by searching for an entry having a match condition that matches a received packet, from the table.
[Tenth Mode]
(Refer to the control instruction apparatus according to the second aspect described above.)
[Eleventh Mode]
A control instruction apparatus corresponding to the third mode.
[Twelfth Mode]
(Refer to the communication control method according to the third aspect described above.)
[Thirteenth Mode]
A communication control method corresponding to the third mode.
[Fourteenth Mode]
(Refer to the program according to the fourth aspect described above.)
[Fifteenth Mode]
A program corresponding to the third mode.
It is to be noted that the tenth to fifteenth modes described above may be expanded, similarly to the first mode, to the second and fourth to ninth modes.

It is to be noted that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 10, 10a, 10e control instruction apparatus
10b, 10c control apparatus
11 control instruction unit
11b switch control unit
12, 12a node state determination unit
12b Forwarding DB (FDB)
13 communication history management unit
13a table group
13b Route DB (RDB)
13c access control rule DB
13d policy DB
13e position based policy table
20 control execution apparatus
20b switch
21, 21b communication unit
22, 22b packet processing unit
23 instruction cache
23b flow table

The invention claimed is:
1. A communication system comprising:
a switch comprising
a communication unit that makes an inquiry concerning a packet processing method, with respect to a prescribed controller, and
a packet processing unit that processes packets based on an instruction from the controller; and
the controller comprising
a communication history management unit that manages communication history between nodes via the controller,
a position based policy table that represents a policy of the nodes,
a node state determination unit that determines, making reference to the communication history of said communication history management unit, or making reference to the policy of the position based policy table, whether or not a node that is a transmission source or a transmission destination of said packet for which the inquiry concerning a processing method was received, is on a side that provides a service to another node, and
a control instruction unit that prohibits, when at least said node is on the side that provides a service to another node, new communication from the node in question to the other node.
2. The communication system according to claim 1, wherein
said node state determination unit further determines whether or not a node that is a transmission source or a transmission destination of a packet for which an inquiry concerning a processing method was received, is on a side that requests provision of a service with respect to another node, and said control instruction unit prohibits, in a case where said node is on the side that requests provision of a service with respect to another node, new communication from the other node to the node in question.

3. A communication system comprising:

a switch comprising a communication unit that makes an inquiry concerning a packet processing method, with respect to a prescribed controller, and a packet processing unit that processes packets based on an instruction from the controller;

the controller comprising a communication history management unit that manages communication history between nodes via the switch, a position based policy table that represents a policy of the nodes, a node state determination unit that determines, making reference to the communication history of said communication history management unit, or making reference to the policy of the position based policy table, whether or not a node that is a transmission source or a transmission destination of said packet for which the inquiry concerning a processing method was received, is on a side that requests provision of a service with respect to another node, and a control instruction unit that prohibits, when at least said node is on the side that requests provision of a service to the other node, new communication from the other node to the node in question.

4. The communication system according to claim 1, further comprising:

an access control rule storage unit that stores an access control rule to be applied to communication between the nodes, wherein a determination is made as to whether or not to prohibit said new communication, based on whether or not communication is possible according to said node state and said access control rule.

5. The communication system according to claim 1, wherein the policy of the position based policy table is configured to determine whether or not the position of said node is on a side that provides a service to the other node, and said node state determination unit, by referring to position information of the node in addition to communication history of said communication history management unit, determines node state.

6. The communication system according to claim 1, wherein the policy of the position based policy table is configured to determine whether or not the position of said node is on a side that provides a service to the other node, and said control instruction unit, in a case where said node position is at a prescribed position, prohibits new communication from the node in question to another node, irrespective of a determination result of said node state determination unit.

7. The communication system according to claim 1, wherein the policy of the position based policy table is configured to determine whether or not the position of said node is on a side that provides a service to the other node, and said control instruction unit, in a case where said node position is at a prescribed position, prohibits new communication from the other node to the node in question, irrespective of a determination result of said node state determination unit.

8. The communication system according to claim 1, wherein said node state determination unit analyses a packet for which an inquiry concerning said processing method has been received, and based on whether a transmission source node has transmitted a connection request or has accepted a connection, determines said node state.

9. The communication system according to claim 1 wherein the switch comprises a table that stores control instructions set by the controller, and said packet processing unit executes packet processing based on an instruction from the controller, by searching for an entry having a match condition that matches a received packet, from said table.

10. A controller comprising:

a communication history management unit that manages communication history between nodes via a switch comprising a communication unit that makes an inquiry concerning a packet processing method, with respect to the controller, a position based policy table that represents a policy of the nodes, and a packet processing unit that processes packets based on an instruction from the controller, a node state determination unit that determines, making reference to the communication history of said communication history management unit, or making reference to the policy of the position based policy table, whether or not a node that is a transmission source or a transmission destination of a packet for which an inquiry concerning a processing method was received, is on a side that provides a service to another node, and a control instruction unit that prohibits, when at least said node is on the side that provides a service to another node, new communication from the node in question to the other node.

11. A controller comprising:

a communication history management unit that manages communication history between nodes via a switch comprising a communication unit that makes an inquiry concerning a packet processing method, with respect to a controller, a position based policy table that represents a policy of the nodes, and a packet processing unit that processes packets based on an instruction from the controller, a node state determination unit that determines, making reference to the communication history of said communication history management unit, or making reference to the policy of the position based policy table, whether or not a node that is a transmission source or a transmission destination of a packet for which an inquiry concerning a processing method was received, is on a side that requests provision of a service to another node, and a control instruction unit that prohibits, when said node is on the side that requests provision of a service to another node, new communication from the other node to the node in question.

12. A communication control method executed by a computer connected to a switch comprising a communication unit that makes an inquiry concerning a packet processing method, with respect to a prescribed controller, and a packet processing unit that processes packets based on an instruction from the controller said computer comprising a communication history management unit that manages communication history between nodes via the switch, and a position based policy table that represents a policy of the nodes, said method comprising determining, by making reference to the communication history of said communication history management unit, or making reference to the policy of the position based policy table, whether or not a node that is a transmission source or a transmission destination of a packet for which an inquiry concerning a processing method was received, is on a side that provides a service to another node, and prohibiting, when at least the node is on the side that provides a service to another node, new communication from the other node to the node in question.

13. A communication control method executed by a computer connected to a switch comprising a communication unit that makes an inquiry concerning a packet processing method, with respect to a prescribed controller, and a packet processing unit that processes packets based on an instruction from the controller, said computer comprising a communication history management unit that manages communication history between nodes via the switch, and a position based policy table that represents a policy of the nodes, said method comprising determining, by making reference to the communication history of said communication history management unit, or making reference to the policy of the position based policy table, whether or not a node that is a transmission source or a transmission destination of a packet for which an inquiry concerning a processing method was received, is on a side that requests provision of a service to another node, and prohibiting, when at least the node is on the side that requests provision of a service to another node, new communication from the other node to the node in question.

14. A non-transient computer-readable storage medium that records a program executed on a computer connected to a switch comprising a communication unit that makes an inquiry concerning a packet processing method, with respect to a prescribed controller, and a packet processing unit that processes packets based on an instruction from the controller, said computer comprising a communication history management unit that manages communication history between nodes via the switch, and a position based policy table that represents a policy of the nodes, said program comprising a process of determining, by making reference to the communication history of said communication history management unit, or making reference to the policy of the position based policy table, whether or not a node that is a transmission source or a transmission destination of a packet for which an inquiry concerning a processing method was received, is on a side that provides a service to another node, and a process of prohibiting, when at least the node is on the side that provides a service to another node, new communication from the node in question to the other node.

15. A non-transient computer-readable storage medium that records a program executed on a computer connected to a switch comprising a communication unit that makes an inquiry concerning a packet processing method, with respect to a prescribed controller, and a packet processing unit that processes packets based on an instruction from the controller, said computer comprising a communication history management unit that manages communication history between nodes via the switch, and a position based policy table that represents a policy of the nodes, said program comprising a process of determining, by making reference to the communication history of said communication history management unit, or making reference to the policy of the position based policy table, whether or not a node that is a transmission source or a transmission destination of a packet for which an inquiry concerning a processing method was received, is on a side that requests provision of a service to another node, and a process of prohibiting, when at least the node is on the side that requests provision of a service to another node, new communication from the other node to the node in question.

16. The communication system according to claim 2, further comprising:

an access control rule storage unit that stores an access control rule to be applied to communication between the nodes, wherein a determination is made as to whether or not to prohibit said new communication, based on whether or not communication is possible according to said node state and said access control rule.

17. The communication system according to claim 3, further comprising:

an access control rule storage unit that stores an access control rule to be applied to communication between the nodes, wherein a determination is made as to whether or not to prohibit said new communication, based on whether or not communication is possible according to said node state and said access control rule.

18. The communication system according to claim 2, wherein the policy of the position based policy table is configured to determine whether or not the position of said node is on a side that provides a service to the other node, and said node state determination unit, by referring to position information of the node in addition to communication history of said communication history management unit, determines node state.

19. The communication system according to claim 3, wherein the policy of the position based policy table is configured to determine whether or not the position of said node is on a side that provides a service to the other node, and said node state determination unit, by referring to position information of the node in addition to communication history of said communication history management unit, determines node state.

20. The communication system according to claim 4, wherein the policy of the position based policy table is configured to determine whether or not the position of said node is on a side that provides a service to the other node, and said node state determination unit, by referring to position information of the node in addition to communication history of said communication history management unit, determines node state.

\* \* \* \* \*